United States Patent
Reiser et al.

(10) Patent No.: US 6,986,958 B2
(45) Date of Patent: Jan. 17, 2006

(54) FUEL CELL STACK MELTING OF COOLANT WATER DURING FROZEN STARTUP

(75) Inventors: Carl A. Reiser, Stonington, CT (US); Frederick F. Sribnik, Windsor, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 140 days.

(21) Appl. No.: 10/361,120

(22) Filed: Feb. 6, 2003

(65) Prior Publication Data

US 2004/0157094 A1 Aug. 12, 2004

(51) Int. Cl.
*H01M 8/04* (2006.01)
*H01M 8/10* (2006.01)

(52) U.S. Cl. .......................... 429/13; 429/26; 429/32; 429/38

(58) Field of Classification Search .................. 429/13, 429/25, 26, 30, 32, 34, 38, 39
See application file for complete search history.

(56) References Cited

U.S. PATENT DOCUMENTS

| | | | | |
|---|---|---|---|---|
| 5,798,186 A | * | 8/1998 | Fletcher et al. ............... | 429/13 |
| 6,379,827 B1 | * | 4/2002 | Cipollini ....................... | 429/13 |
| 6,528,194 B1 | * | 3/2003 | Condit et al. ................ | 429/26 |
| 6,562,503 B2 | * | 5/2003 | Grasso et al. ................ | 429/26 |
| 6,605,378 B2 | | 8/2003 | Saito et al. | |
| 6,673,481 B1 | * | 1/2004 | Reiser et al. ................ | 429/13 |
| 2003/0129465 A1 | * | 7/2003 | Nakamura et al. ........... | 429/26 |

FOREIGN PATENT DOCUMENTS

WO WO 02/35632 * 5/2002

* cited by examiner

*Primary Examiner*—Jonathan Crepeau
(74) *Attorney, Agent, or Firm*—M. P. Williams

(57) ABSTRACT

A PEM fuel cell system (19) has a multifunction oxidant manifold (98) disposed contiguously beneath a fuel cell stack (20), serving as coolant accumulator (28). An electric heater (45) is powered by the fuel cell electrical output (47, 51) during frozen startup. Auxiliary pump (54) and conduits (55, 57, 58) forces water (28) above oxidant pressure in upper coolant manifold (41), into the oxidant flow fields to be warmed before flowing from the oxidant exhaust to the accumulator to melt additional ice. Alternatively, melted coolant is forced by oxidant pressure into coolant channels for heating. Conduit (61) conducts coolant from the coolant flow fields to the accumulator. A condensing heat exchanger (65) embedded in accumulator coolant receives oxidant exhaust. A condensing heat exchanger (70) has cold inlet air (75) and warm moist oxidant exhaust (72) on opposite sides, condensing liquid into the accumulator. Melting of coolant may be started by a heater (45) powered by a battery (80) or by circulating externally heated (83) glycol.

51 Claims, 15 Drawing Sheets

FIG.6  300 BTU/hr – °F; HX; NO HEATER

FIG. 7  300 BTU/hr - °F; 2.5kW HEATER

FIG. 8  900 BTU/hr – °F CONDENSER; NO HEATER

US 6,986,958 B2

FUEL CELL STACK MELTING OF COOLANT WATER DURING FROZEN STARTUP

TECHNICAL FIELD

This invention relates to fuel cell stacks which utilize cell stack power for heaters to melt frozen coolant water in accumulators immediately upon startup, and/or which utilize waste heat from the fuel cell operation when supplying current to a load to melt accumulator ice, directly, or by means of condensing heat exchangers.

BACKGROUND ART

One difficulty with utilizing fuel cells to power the propulsion system of electric vehicles is the requirement that such vehicles be operable at temperatures below that at which water will freeze (below freezing). Freezing may cause mechanical damage as a consequence of the expansion of ice, and presents problems due to the inseparability of water and the fuel cell processes. Heretofore, various methods of initiating operation of a fuel cell, preparatory to the operation of an electric vehicle, have concentrated on providing heat, either by reaction or combustion of fuel, or by means of battery power, to various water and other coolant conduits and reservoirs. Other efforts are directed toward processes designed to accelerate the rate at which a fuel cell stack will heat up to above-freezing temperatures, as a consequence of its own operation. In U.S. Pat. No. 5,798,186, a proton exchange membrane (PEM), fuel cell is warmed up simply by connecting a load across it while stochiometric fuel and oxidant are supplied to the stack. In one experiment, with the fuel, oxidant and coolant water passages all having been purged of water upon previous shutdown of the stack, application of hydrogen and air at room temperature caused a temperature in the core of a ten cell stack to advance from $-11°$ C. to $0°$ C. in about one minute. A four cell stack, in which only the reactant channels (and not the coolant channel) were purged upon previous shut down, required five minutes, after circulation of hydrogen and oxygen began and a 50 amp load was connected, to increase from $-19°$ C. to $0°$ C. Coolant was not circulated until about 23 minutes after startup. In a four cell stack in which none of the channels were purged at the prior shut down, flow of warm hydrogen did not begin to occur until after four minutes, and 12 minutes expired between startup at $-23°$ C. and reaching $0°$ C. within the core of a four cell stack. In U.S. Pat. No. 6,329,089, individual fuel cells at $-5°$ C. started with room temperature hydrogen and air reached 0.5 amps per $cm^2$ in five minutes. With a short circuit load, a seven cell stack with a core temperature of $-15°$ C. reached 0.5 amps per $cm^2$ nine minutes after prolonged short circuiting of the stack output. Performance of other experiments were less satisfactory.

For use in vehicles, such as automobiles, an electric propulsion system must be operating in less than one minute, preferably less than one-half minute, after initiating startup. In commonly owned, copending U.S. patent application Ser. No. 10/187,547, filed Jul. 1, 2002 now abandoned, a vehicle propulsion system is started up in a condition in which at least a portion of the fuel cell stack is below the freezing temperature of water, and the entire vehicle may be in an ambient environment which is below the freezing temperature of water. Substantially all of the water in the hydrophilic support plates and the reactant gas flow fields and coolant channels is removed, which may be achieved in accordance with a procedure disclosed either in U.S. patent application Ser. No. 09/826,739, filed Apr. 5, 2001 now U.S. Pat. No. 6,596,426, or Ser. No. 09/826,739, filed Apr. 5, 2001. Thus, there may likely be ice in the PEM, and the anode and cathode catalyst layers, as well as within the pores of the water transport plates. However, it should be borne in mind that the water transport plates themselves can hold ice within the pores without doing damage to the water transport plates, as in the case for the PEM. Furthermore, the substrates are sufficiently close to the PEM itself that the temperature of the water that is transferred into the substrates will very nearly follow the temperature of the PEM, rather than the temperature of the reactant gases themselves. Thus, even though the water transport plates have ice in the pores thereof, product water will not freeze in the substrates.

In said copending application, a PEM fuel cell stack at subfreezing temperature is connected to a vehicle propulsion system within a few seconds, or as soon as the stack provides open circuit voltage. The fuel cell stack is started with more than a stochiometric flow of fuel and at least three times to five times stochiometric flow of oxidant, which may be at subfreezing temperatures, whereby to prolong operation without localized heating, thereby permitting the vehicle to be used during the time that the apparatus and fluids are being heated to suitable, operational temperatures. That system takes advantage of reactants which are at the same sub-freezing ambient temperature as the fuel cell stack itself, since that prolongs the onset of localized overheating. In systems in which porous water transport plates are used for water management, heating of the water stored as ice in the pores of the water transport plates, by heating up the mass of the stack, heating up of that water, the heat of fusion as the ice melts, and evaporative cooling of some of that water, all prolong the period of time at which the vehicle can be operated with power from the fuel cell stack, without circulating coolant, before there is impermissible local heating within the fuel cell. Such time is about 15–20 minutes in a typical case.

DISCLOSURE OF INVENTION

Objects of the invention include: accelerating the availability of coolant water in a PEM fuel cell stack being started with at least some portion of the stack at a temperature below the freezing temperature of water; utilizing waste heat of the fuel cell process to melt frozen coolant water in the accumulator within a fuel cell stack assembly; utilizing electric power generated by a fuel cell stack to melt frozen coolant water in the accumulator of the fuel cell stack; reducing the time required to provide coolant water internally of a fuel cell stack which is started up from at least a partially frozen state; and increasing the amount of power which may be extracted from a fuel cell stack when initially started up from a frozen state, without localized overheating of the fuel cell stack.

This invention is predicated in part on the discovery that a PEM fuel cell stack assembly can develop sufficient power within a few seconds of startup, when at least partially frozen, not only to provide adequate power to drive an electric-powered vehicle in an acceptable, normal manner, but also to provide sufficient power to thaw frozen coolant water in a coolant water accumulator of the cell stack assembly. The invention is also further predicated in part on the discovery that waste heat of the fuel cell process can be readily extracted and transferred to frozen coolant water in an accumulator so as to melt the frozen water in the accumulator, with or without assistance of an electric heater.

As used herein, the "start up" means a time at and immediately following application of fuel and reactant gases to the fuell cell stack.

According to the present invention, frozen water in a coolant water accumulator of a fuel cell stack is melted, at least in part, by means of energy generated by the fuel cell stack itself in the first minutes after startup. In further accord with the invention, an electric heater powered by the fuel cell stack, beginning within seconds of startup, heats the frozen water in the accumulator. According further to the invention, heat for melting frozen coolant water within a PEM fuel cell stack is extracted from waste fuel cell heat generated in the fuel cell stack itself.

In an embodiment of the invention, the heat is extracted by means of a condensing heat exchanger, which may be either (a) immersed in the frozen coolant water within the accumulator, the other input to the condensing heat exchanger comprising the oxidant reactant flow field exhaust, or (b) disposed within the oxidant reactant flow field exhaust, the other input of which being the oxidant reactant flow field input (such as incoming air).

According to the invention still further, frozen water in the accumulator of a fuel cell stack may be partially melted by a relatively small electric heater, the water being moved by an auxiliary pump to an upper coolant manifold (typically the coolant exit manifold of the fuel cell stack) and allowed to pass through the fuel cell stack, propelled by gravity and/or oxidant flow, where it is heated significantly by the waste heat of the fuel cell operation while delivering current to a load, and then being conveyed from the lower coolant (typically inlet) manifold back to the coolant accumulator where it melts additional frozen coolant.

In still further accord with the invention, as a variant to the foregoing, pressure of the coolant liquid provided by an auxiliary pump to the upper coolant manifold of a PEM fuel cell stack may force the liquid coolant water out through the pores of water transport plates into the reactant gas flow fields, thereby providing humidification to the membrane electrode assembly (MEA), the liquid water then being warmed by the waste heat of the fuel cell operation while delivering current to a load, and dripping from the oxidant flow field exhaust back into the coolant water accumulator, where the warmed coolant water melts additional ice. As a further variant, the small amount of liquid water may be applied to the channels, cyclically, by inlet oxidant pressure, and thereafter moved through the coolant channels by the coolant pump, if the pump and conduits are protected from freezing. This is possible because the coolant channels will be empty, having been drained as aforesaid.

In accordance with the invention, a multi-function manifold is disposed directly beneath and contiguous with a fuel cell stack, serving as the coolant water accumulator; and also containing a heat exchanger for transferring heat within the stack internal coolant water to external coolant which may be pumped through a radiator; optionally also including an electric heater within the accumulator for melting accumulator ice during sub-freezing startups; and optionally also including a condensing heat exchanger interacting with oxidant in selectable ways.

The invention may use external energy (electric or thermal) to melt some coolant, after which that coolant is warmed by fuel cell waste heat.

Various aspects of the invention may be used together in combination, or used separately.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
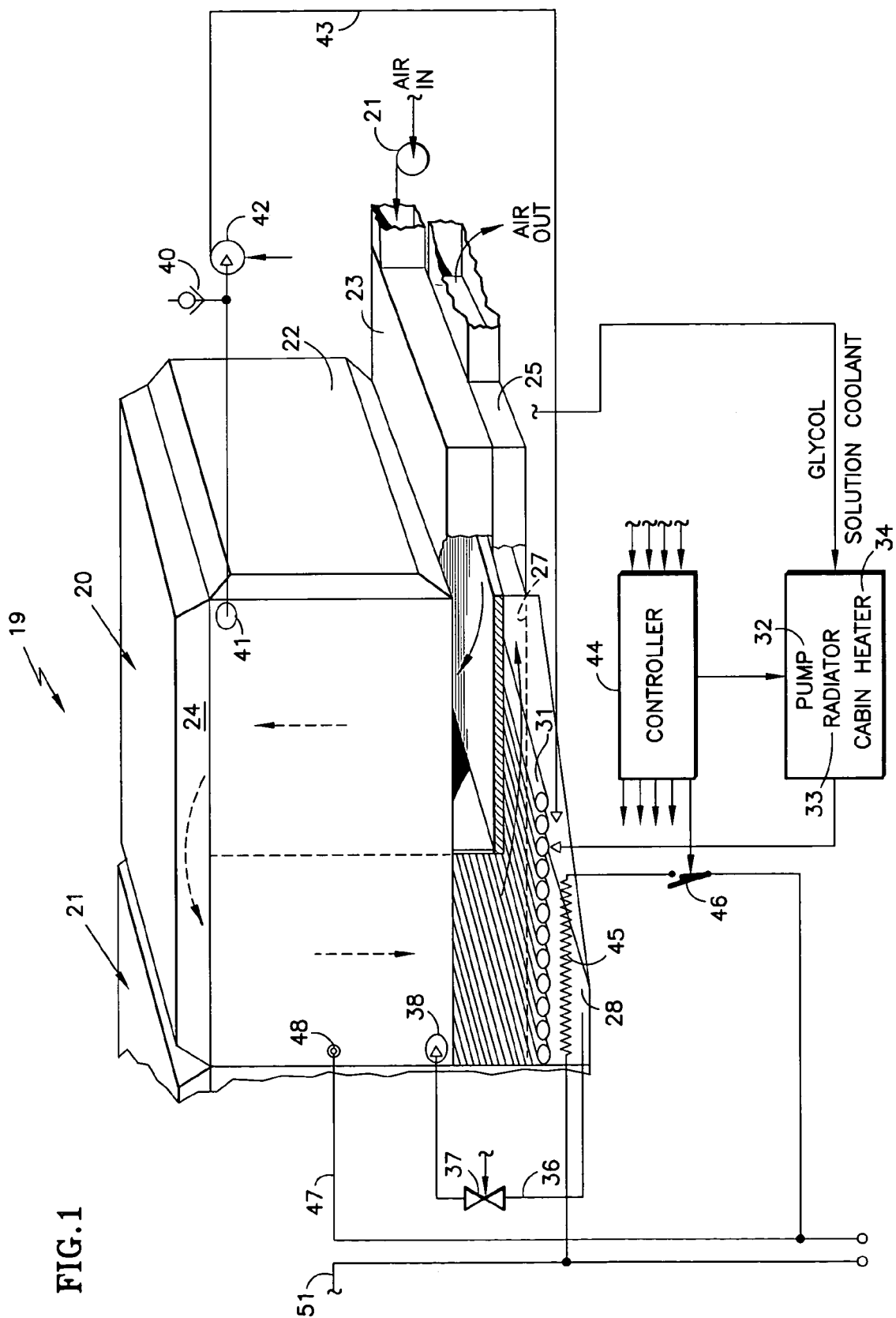
FIG. 1 is a partially sectioned, partially broken away, schematic perspective of a two-section PEM fuel cell stack incorporating an electric heater powered by the stack to melt coolant water in the accumulator.

Referring to FIG. 1, a fuel cell stack assembly 19 comprises two sections 20, 21 of fuel cell stack, each section including a plurality of contiguous fuel cells which may, for instance, employ a membrane electrode assembly (MEA) utilizing a proton exchange membrane (PEM) of a known type. The fuel cell stack assembly 19 will have a fuel system which is not relevant to the present invention, and which is therefore not shown. The fuel system will typically have a source of hydrogen or hydrogen-rich fuel feeding a fuel inlet manifold (not shown) which is interconnected with half of the fuel flow fields of the anode, a fuel flow turnaround 22, the outflow of which passes through the remainder of the fuel flow fields to a fuel exit manifold (not shown); the fuel exhaust is typically applied to a fuel recycle system, of some known sort.

In FIG. 1, the section 20 has an inlet manifold 23 for oxidant reactant gas, such as air from a source such as a pump 21, an air turnaround manifold 24 and an air exit manifold 25. As seen in FIG. 1, the air will flow upwardly through cathode (oxidant) flow fields (to the right in FIG. 1) and then leftwardly through the turnaround manifold 24, downwardly through the remainder of the oxidant flow fields, (at the left in FIG. 1) and then through space above the level 27 of coolant in a coolant accumulator 28, to the exit manifold 25. The coolant accumulator has tubes 31 which receive glycol solution coolant impelled by a pump 32, when the fuel cell has been fully started and is operating normally; the glycol solution coolant may be cooled in a radiator 33 and selectively utilized, as necessary, in a cabin heater 34, all as is known and forms no part of the present invention. However, during startup when at least a portion of the cell stack assembly 19 may be at a temperature below freezing, the glycol solution coolant is not circulated through the heat exchanger tubes 31.

When operating normally above freezing temperatures, water in the accumulator 28 will be drawn into a coolant conduit 36, passed through a flow restrictor valve 37, through a coolant inlet manifold 38, and through channels (not shown) in the fuel cells, and emerge from a coolant exit manifold 41, under the propulsion of a coolant pump 42, through a conduit 43 to the accumulator 28, all as is conventional. However, during startup of the fuel cell stack assembly 19 when at least a part of it is below freezing temperature, the pump 42 is off, and the restrictor 37 may, if desired, be completely closed so that there is no coolant flow from accumulator 28 into the coolant inlet manifold 38, nor from the coolant outlet manifold 41 through the pump 42 and conduit 43 to the accumulator 28 (except as described in one embodiment hereinafter). In one embodiment, the coolant channels are in porous water transport plates which provide a porous barrier between the water channels and the reactant flow fields, as is known. A controller 44 responds to various conditions in the cell stack assembly 19, including particularly the temperature of water in the accumulator 28, to control various functions of the cell stack assembly, including the valve 37 and the pumps 32, 42.

The conduit 36 may be disposed within the accumulator 28; in that case, the restrictor 37 may take the form of a weir or screen disposed near the inlet to the conduit 36 so as to create vacuum in the coolant during normal operation.

In accordance with a first aspect of the present invention, a resistance heater 45 is immersed in the accumulator below the level 27 of coolant (ice and/or water). The heater 45 need not be immersed in coolant; it could be in or on the walls of the accumulator. The heater 45 is connected through a switch 46 and conductor 47 to one electrical output 48 of the fuel cell stack 19. The other end of the heater 45 is connected through a conductor 51 to the other electrical output (not shown) of the fuel cell stack 19. When starting up the fuel cell stack when some portion of it is or may be frozen, the controller 44 can close the switch 46 to provide power to the heater 45, which begins to melt any ice in the accumulator 28.

Figure 2:
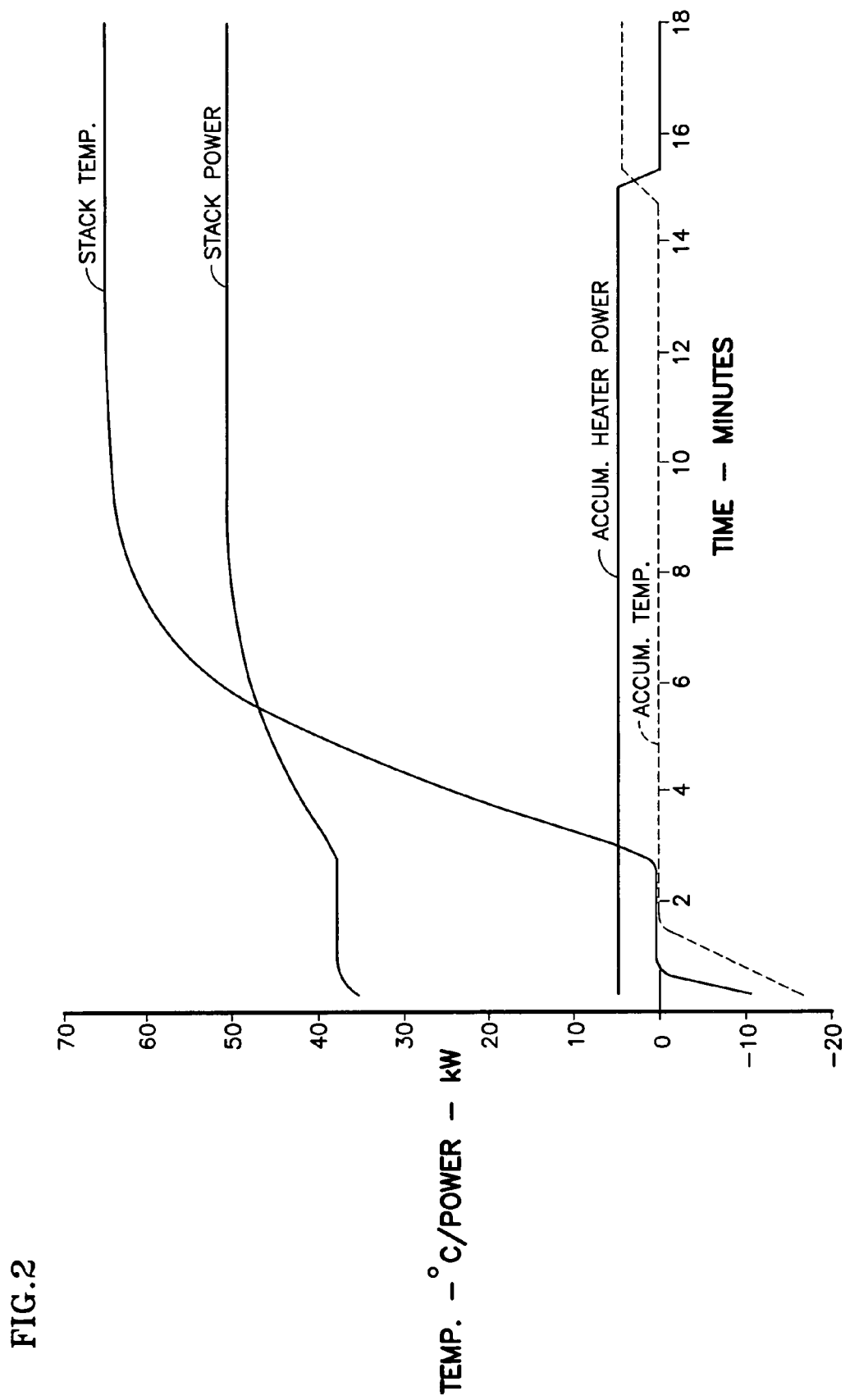
FIG. 2 is a chart illustrating stack and accumulator temperature and stack power, in the invention of FIG. 1 utilizing a 5 kW heater.

As illustrated in FIG. 2, if the heater 45 operates at 5 kW, which is reasonable for a typical fuel cell system powering an electric vehicle, which may have a 90 kW capacity, 12 kilograms (26 pounds) of ice in the accumulator will be melted in about 15 minutes. In the aforementioned application Ser. No. 10/187,547, it is seen that the fuel cell stack 19 can operate without coolant water for at least 15 minutes without localized overheating; at such a time, the valve 37 can be placed in the position to provide an adequate restriction, so as to create the proper negative pressure differential with respect to the reactant gas pressures, and the pump 42 can be started so as to cause coolant to circulate from the accumulator 28, through the conduit 36 and the valve 37, into the coolant inlet manifold 38, through the cell stack, out of the exit manifold 41, through the pump 42 and thence returning to the accumulator 28. This will be under the direction of the controller 44, which can respond to a temperature sensor (not shown for clarity) in the accumulator 28, or in some other fashion. Thus, the accumulator coolant may be completely melted by means of electric power generated by the fuel cell stack.

Instead of using the heater to melt all of the water in the accumulator, the apparatus illustrated in FIG. 1 can be used in a different manner. The heater can be very small, on the order of 1 kW–2 kW, and the valve 37 can be adjusted by the controller to be fully open, when the reactant gases are initially applied to the stack. Under this condition, the pressure of the air exiting the stack into the space above the accumulator, which may be on the order of 7–15 kilopascals (1–2 pounds) above atmospheric pressure, will force water which is melted by the heater upwardly through the valve 37 and into the initially-empty coolant flow channels within the stack. The heater 45 can be arranged so as to melt ice up to the level 27 of coolant to ensure that the pressure of the oxidant reactant gas will be operable on the water at the bottom of the accumulator 28. The near freezing water entering the stack is warmed considerably by the waste heat within the stack as the water flows in a normal direction in the coolant channels.

In one mode of operating this aspect of the invention, as the level of coolant gradually rises upwardly within the stack, it will eventually flow out of the coolant exit manifold 41 into the return loop, reaching the pump 42. At that point, the pump 42 may be turned on thus pumping a significant amount of warm water back to the accumulator for melting more of the ice in the accumulator. This mode is most effective if the amount of water stored in the accumulator when the stack is drained is significantly more than the amount of water required to fill the remainder of the coolant system. This procedure may continue until enough water has been melted so that the coolant channels are completely filled, and water will exit the exit manifold 41 and reach the pump 42, after which the controller 44 can start the pump and provide normal coolant flow through the system. However, that may take too much time.

Another method of using this aspect of the invention is to reduce the pressure of the oxidant reactant gas (the air) periodically during the initial few minutes after reactant gases have been applied to the fuel cell. In this mode, water will pass upwardly through the conduit 36, the valve 37 and into the coolant inlet manifold, where it will become warmed. This will exhaust the melted coolant that is available. When the pressure is reduced (such as by turning off the air blower momentarily) the small amount of water will flow back to the accumulator and the significant sensible heat therein will melt significantly greater amounts of coolant. This process can be repeated several times in the first few minutes, thereby enhancing the melting of ice by transfer of heat generated in the stack to coolant in the accumulator. Thus, the accumulator coolant may be melted only partially by electric power generated by the fuel cell stack, and additionally, by water which has been warmed within the coolant channels of the stack.

In order to allow water to rise through the coolant channels of the stack, a selectively operable vent 40 may be provided near the coolant exit manifold 41. This may take the form of a check valve since outward pressure will occur only as the water is rising slowly through the coolant channels; once the pump is started and the valve 37 is adjusted as a restrictor, the coolant will be at a pressure less than atmospheric and therefore the valve will remain closed. On the other hand, an electrically actuable valve can be operated by the controller 44, if desired.

As is known, the stack 20 must be between the pump 42 and the restrictor valve 37 to provide coolant below atmospheric pressure during normal operation.

If desired, and if the pump and conduits are protected from freezing, the process of melting coolant with the heater 45 may be enhanced by using the pump 42 to circulate whatever water does melt, into the stack to become much warmer, so as to melt additional coolant upon its return to the accumulator. The essence is using energy, either electric or thermal or both, generated by the fuel cells in the first few minutes, to melt the coolant.

Figure 3:
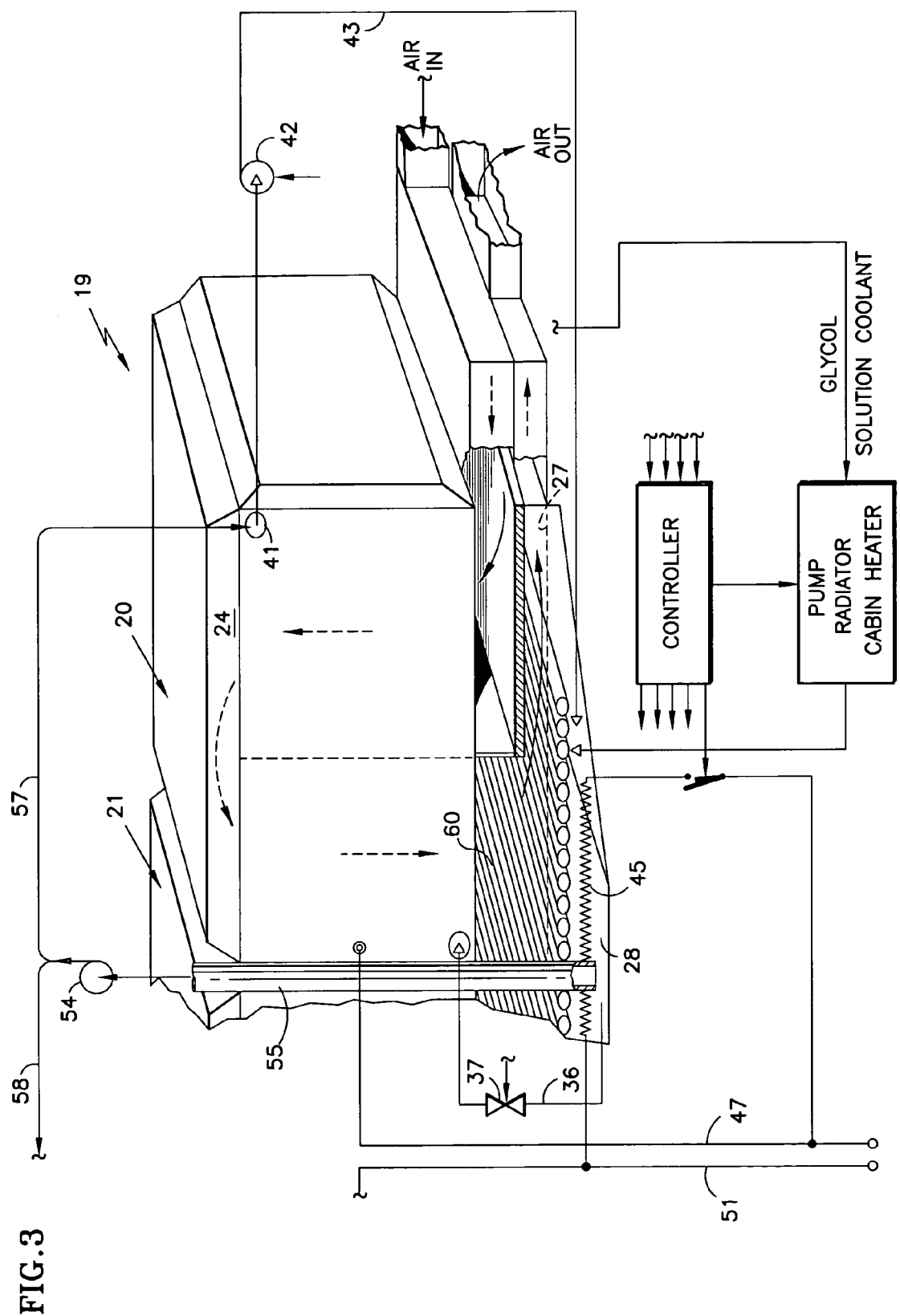
FIG. 3 is a partially sectioned, partially broken away, schematic perspective of a two-section PEM fuel cell stack incorporating an auxiliary pump to provide melted coolant water from the accumulator to an upper coolant water manifold.

Referring to FIG. 3, a second aspect of the present invention uses a small auxiliary pump 54 to draw water through a conduit 55 from the bottom of the accumulator 28 and apply it over conduits 57, 58 to each section 20, 21 of the fuel cell stack 19. The conduit 57 flows the melted water in reverse from the reservoir to the coolant exit manifold 41 (bear in mind that the pump 42 is off). The heater 45 may melt water inside and outside the conduit 55, so water can flow through the conduit. Thereafter, the pressure created by the pump 54 is greater than the pressure of the reactant gases (the fuel and oxidant) so that water applied to the exit manifold 41 will be forced out, through the porous water transport plates (WTPs) in each fuel cell, the water thereby entering into the oxidant reactant gas flow fields. That water will be carried along in the flow of oxidant reactant gas and drip into the space 60 above the level 27 of the ice/water in the reservoir 28, and thereby tend to melt additional ice within the accumulator 28. Note that the water which is melted and transported by the auxiliary pump 54 to the coolant channels is barely above 0° C. (32° F.); but after passing through the fuel cell stack 19, will be substantially warmer, such as on the order of about 15° C.–60° C. (about 100° F.–140° F.). Thus there will be significant melting at the top of the accumulator as a result of this warm water dripping in from the oxidant reactant gas flow field. The waste heat of the fuel cell begins as soon as reactant gases are provided to the fuel cell, and a load, such as a vehicle propulsion system, is connected across the fuel cell output 51, 47. The warm water which enters the oxidant flow field and is carried along by the flow of air is sufficient to melt the ice in a typical accumulator for a PEM fuel cell in a vehicle within about 15 minutes. As described hereinbefore, that is adequate to ensure that liquid water is available by the time the fuel cell stack will have warmed to a point where cooling is required in order to avoid damage from localized heating.

Figure 4:
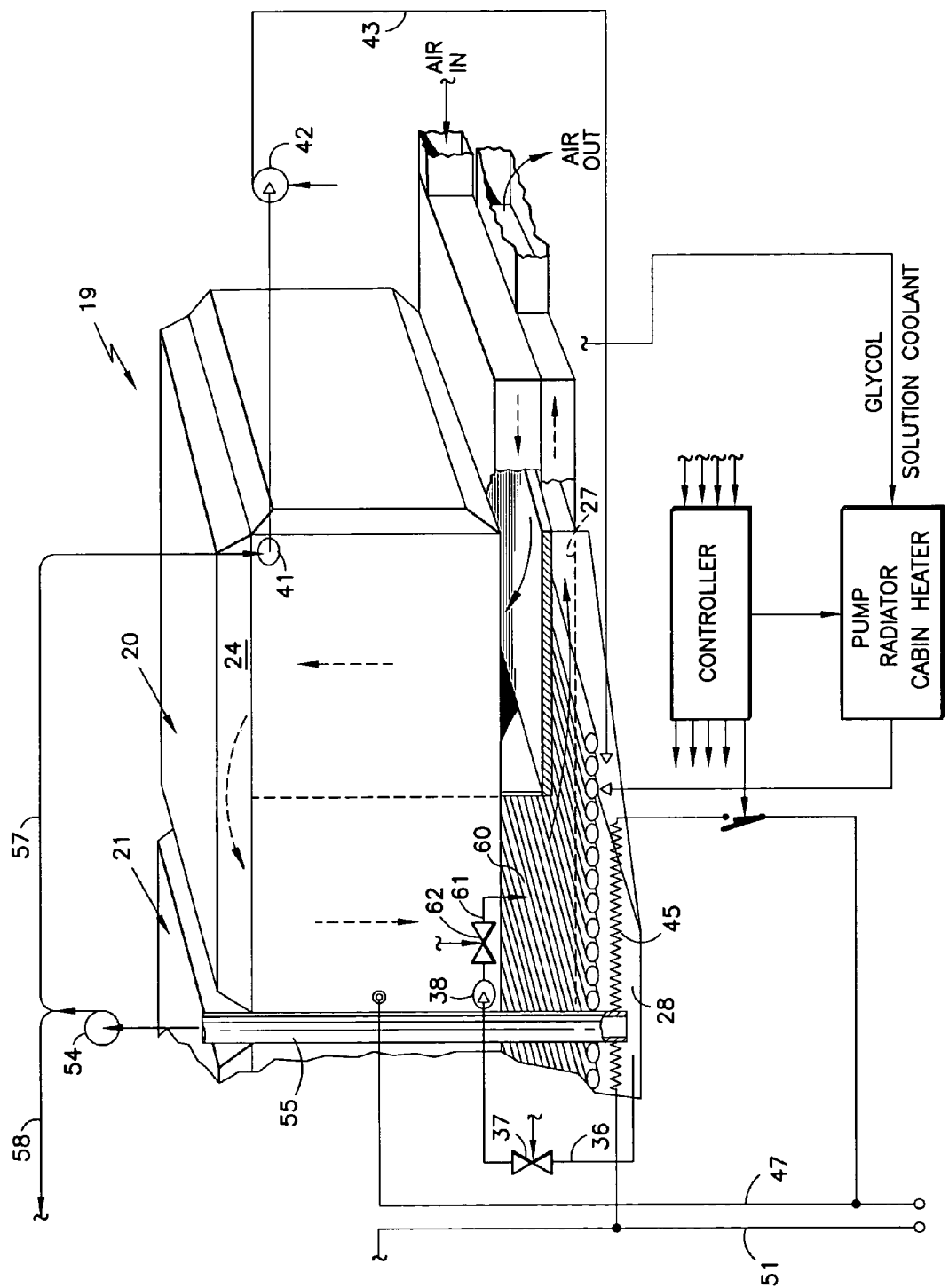
FIG. 4 is a partially sectioned, partially broken away, schematic perspective of a two-section PEM fuel cell stack incorporating an auxiliary pump to provide melted coolant water from the accumulator to an upper coolant water manifold and having a conduit to return coolant water from the stack to the accumulator.

A variant on the apparatus of FIG. 3 is illustrated in FIG. 4. Therein, the auxiliary pump 54 applies liquid water to the upper (exit) coolant manifold 41, but instead of relying only on the flow of water out, through the water transport plates, and into the oxidant flow fields, water can also flow through the water channels to the coolant inlet manifold 38. Then, a conduit 61 will convey water back to the top of the space 60 above the level 27 of ice/water, provided a valve 62 is open. Thus, some of the water simply flows in reverse through the coolant channels in each fuel cell and is returned by the conduit 61 to the accumulator 28. This water will be warmed in the same fashion, to a somewhat lesser degree, by the waste heat of the fuel cell process, which is thereby harnessed to melt the ice in the accumulator 28 upon startup.

If the pressure is maintained by the pump 54 sufficiently to force water out through the water transport plates, the water can clearly flow both in the oxidant reactant channel and in the conduit 61; in either case, the water is warmed substantially to temperatures described hereinbefore, and thereby will contribute significantly to melting of the ice in the accumulator 28.

If desired in any embodiment, such as in a case in which coolant channels are not within porous plates, the pressure of the pump 54 may be lower than that required to force water into gas flow fields, relying only on the coolant channels to heat the water. Or, the normal coolant pump may be used to pump a small amount of water through the stack to heat the water as described with respect to FIGS. 13 and 14, hereinafter), provided all the conduits are protected from freezing, as described hereinbefore.

Figure 5:
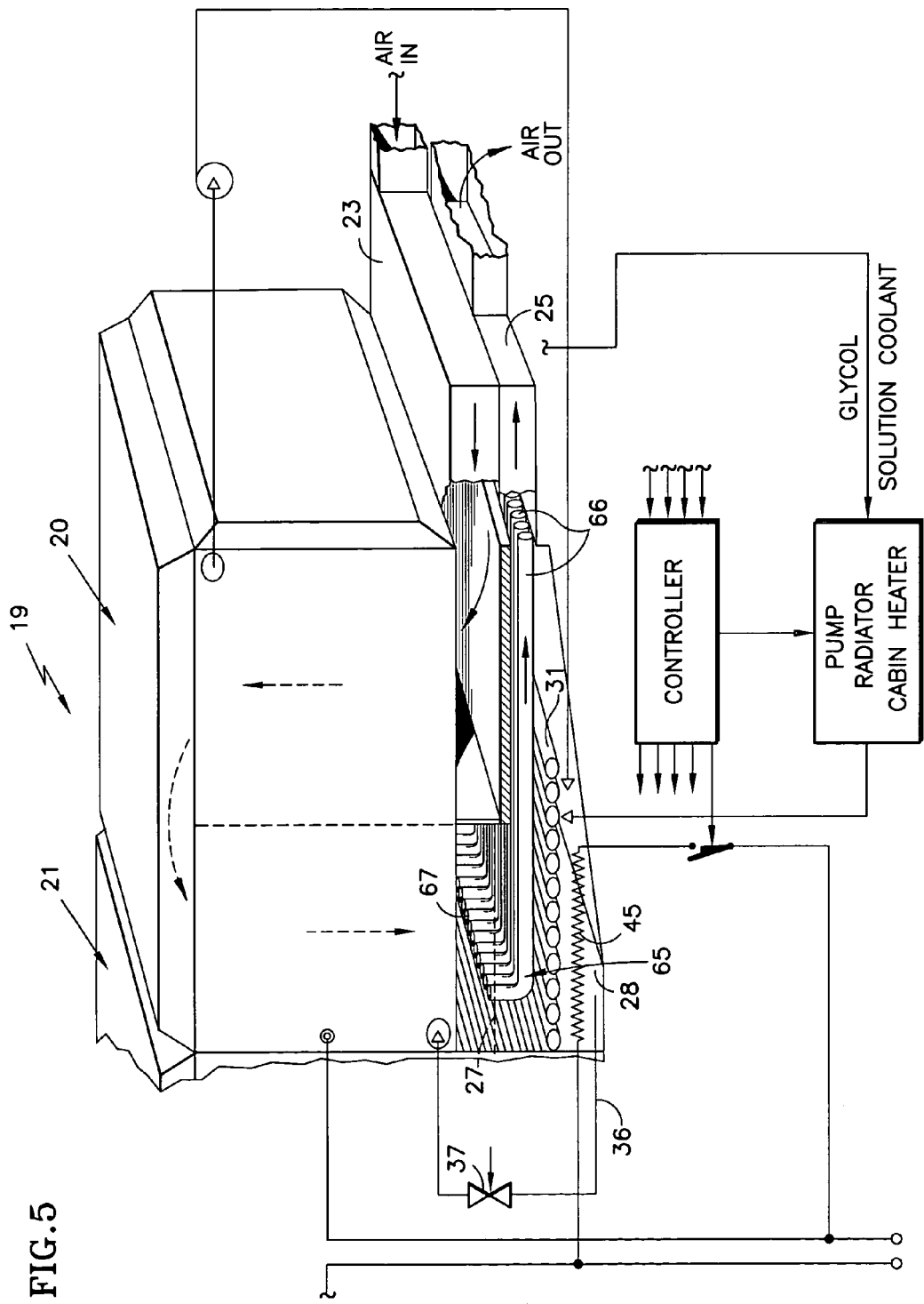
FIG. 5 is a partially sectioned, partially broken away, schematic perspective of a two-section PEM fuel cell stack incorporating a condensing heat exchanger in which oxidant flow field exhaust is used to melt ice within the coolant water accumulator.

In FIG. 5, another aspect of the invention utilizes a condensing heat exchanger 65 comprising a plurality of tubes 66 disposed within the accumulator, the entrance 67 of which is in fluid communication with the oxidant flow field exhaust. Since the heat exchanger is cooled by being in contact either with ice or with water at near zero temperature, not only will the sensible heat of the oxidant flow field exhaust raise the temperature of the medium in the accumulator, but considerable moisture derived from product water in the oxidant flow field exhaust will be condensed, resulting in latent heat of condensation being transferred through the heat exchanger walls to the adjacent ice or water.

Figure 6:
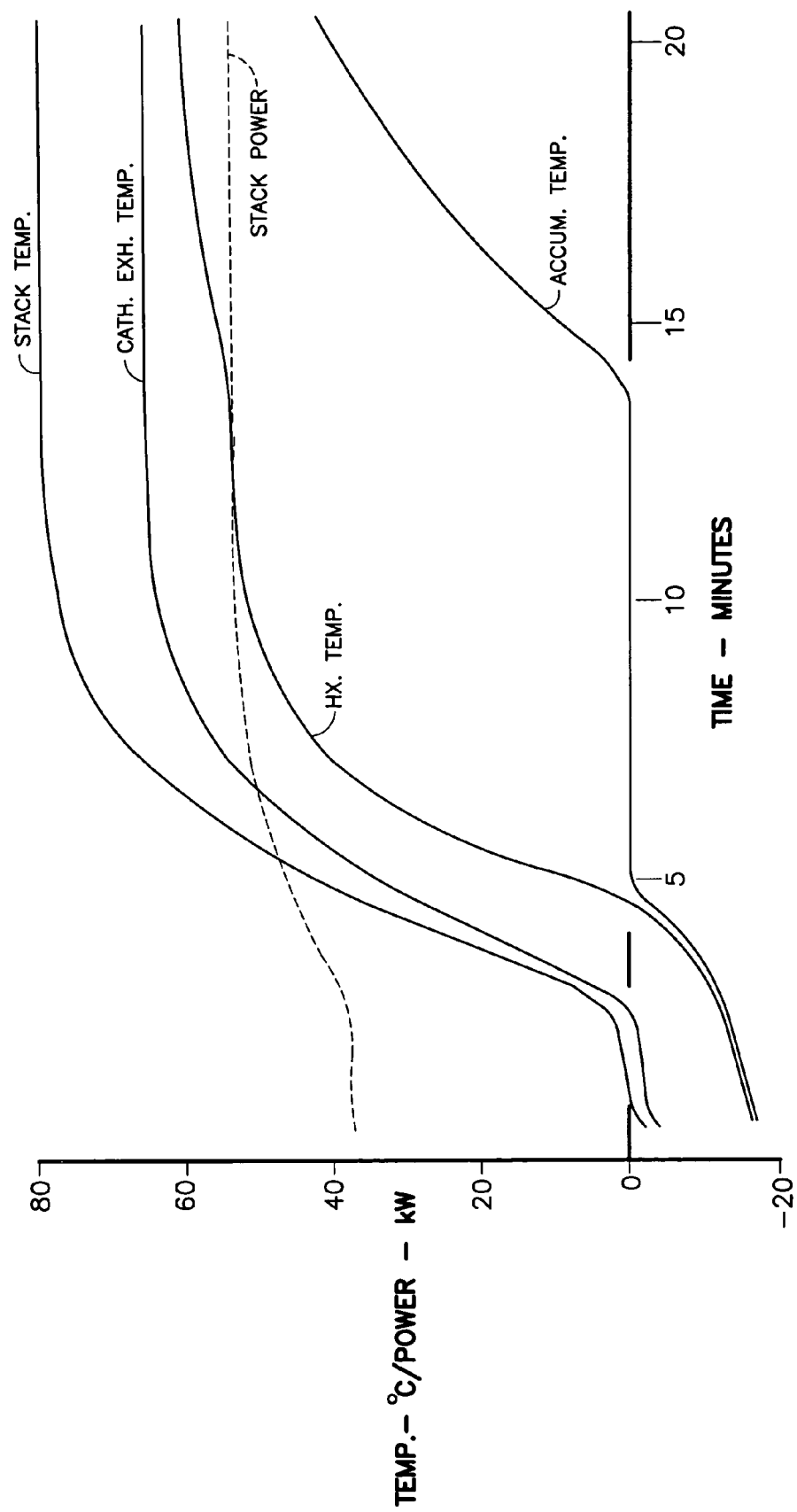
FIG. 6 is a chart of temperatures of the stack, cathode exhaust, heat exchanger, and accumulator, along with stack power, as function of time, for the embodiment of FIG. 6 having a 3,000 Btu/hr-degree F. heat exchanger, but without using the electric heater.

For a heat exchanger 65 having a capacity of 300 Btu/hr-° F., with no assistance from an electrical heater (such as the electrical heater 45), it is seen in FIG. 6 that the temperature adjacent to the heat exchanger (HX TEMP.) will be above freezing in about 4½ minutes. The result is that the temperature in the accumulator will be above freezing in about 13½ minutes (FIG. 6). Thus, water will be available for humidification and cooling in less than 15 minutes utilizing such a condenser.

Figure 7:
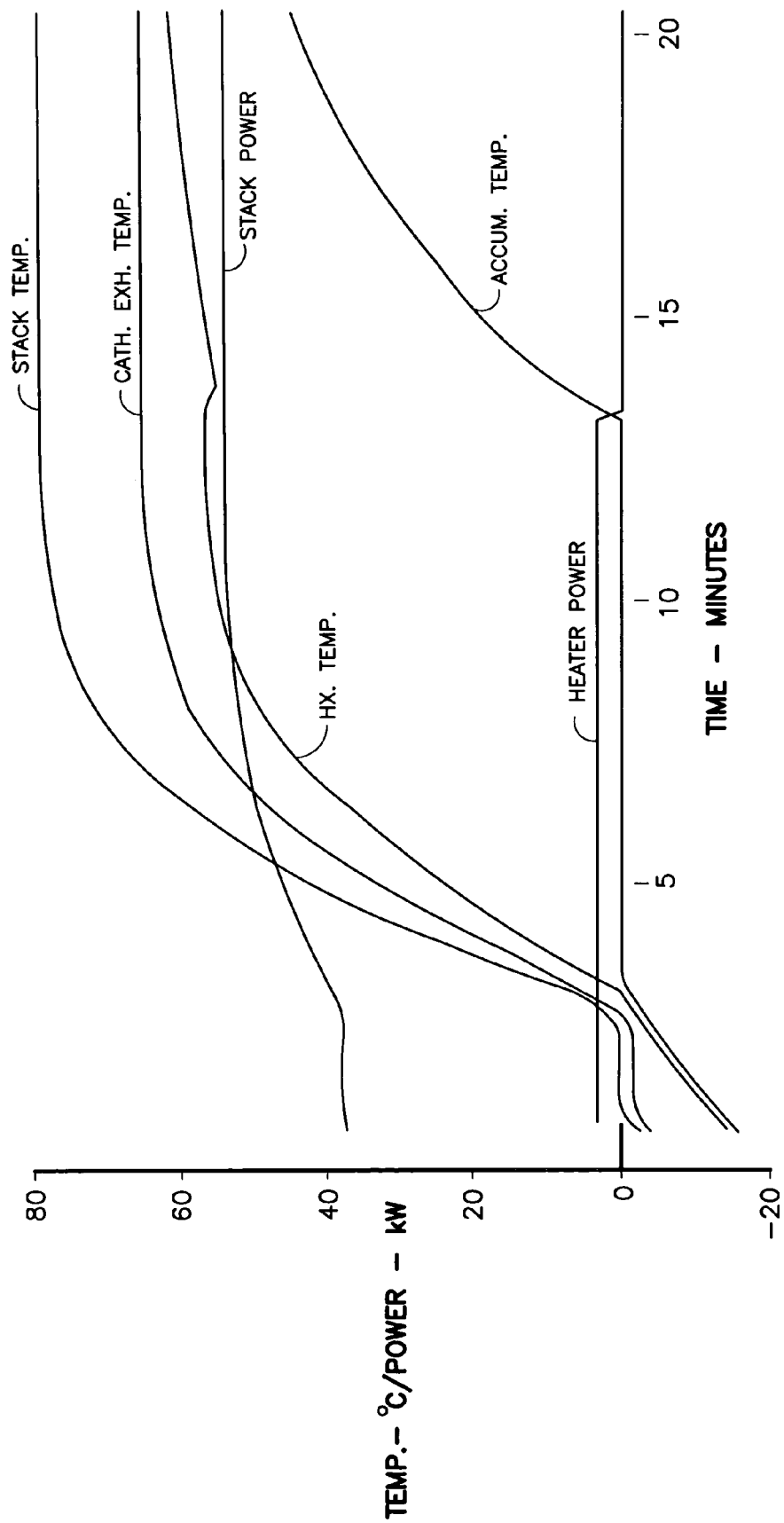
FIG. 7 is a chart of temperatures of the stack, cathode exhaust, heat exchanger, and accumulator, along with stack power, as function of time, for the conditions of FIG. 7 but with 2.5 kW of electric heat.

In FIG. 7, the results are shown when a small electric heater 45, such as 2.5 kW, is used in conjunction with the condensing heat exchanger 65 recorded in FIG. 6. It is seen that the heat exchanger temperature will be above zero in about only three minutes, and the accumulator temperature will rise above freezing in about 13 g minutes.

Figure 8:
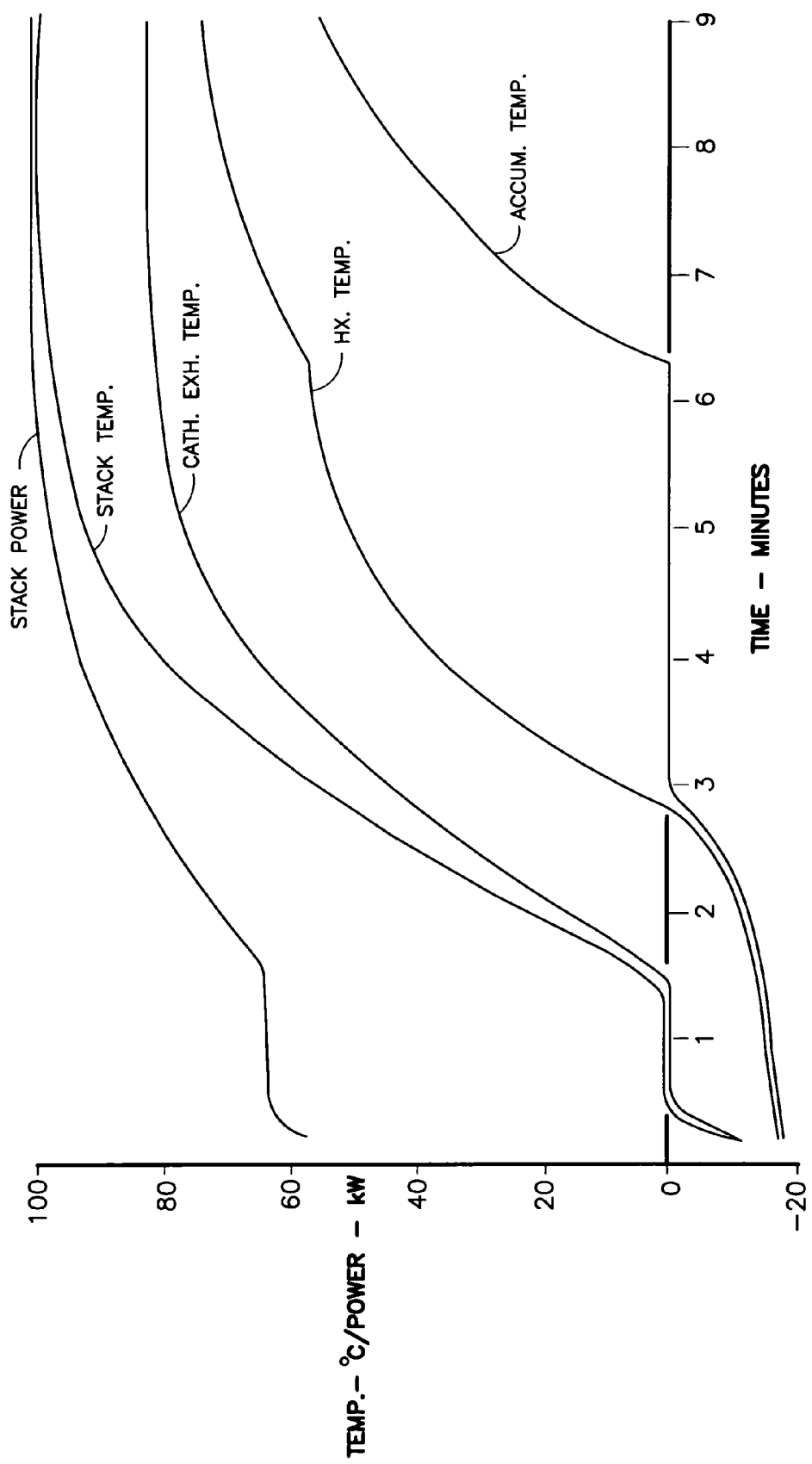
FIG. 8 is a chart of temperatures of the stack, cathode exhaust, heat exchanger, and accumulator, along with stack power, as function of time, for the embodiment of FIG. 6 having a 900 Btu/hr-degree F. heat exchanger, but without using the electric heater.

As seen in FIG. 8, for a larger heat exchanger 65 of 900 Btu/hr-° F. capacity, used without an electric heater, the heat exchanger will rise above freezing in less than three minutes, and the accumulator temperature will rise above freezing in just over six minutes.

Figure 9:
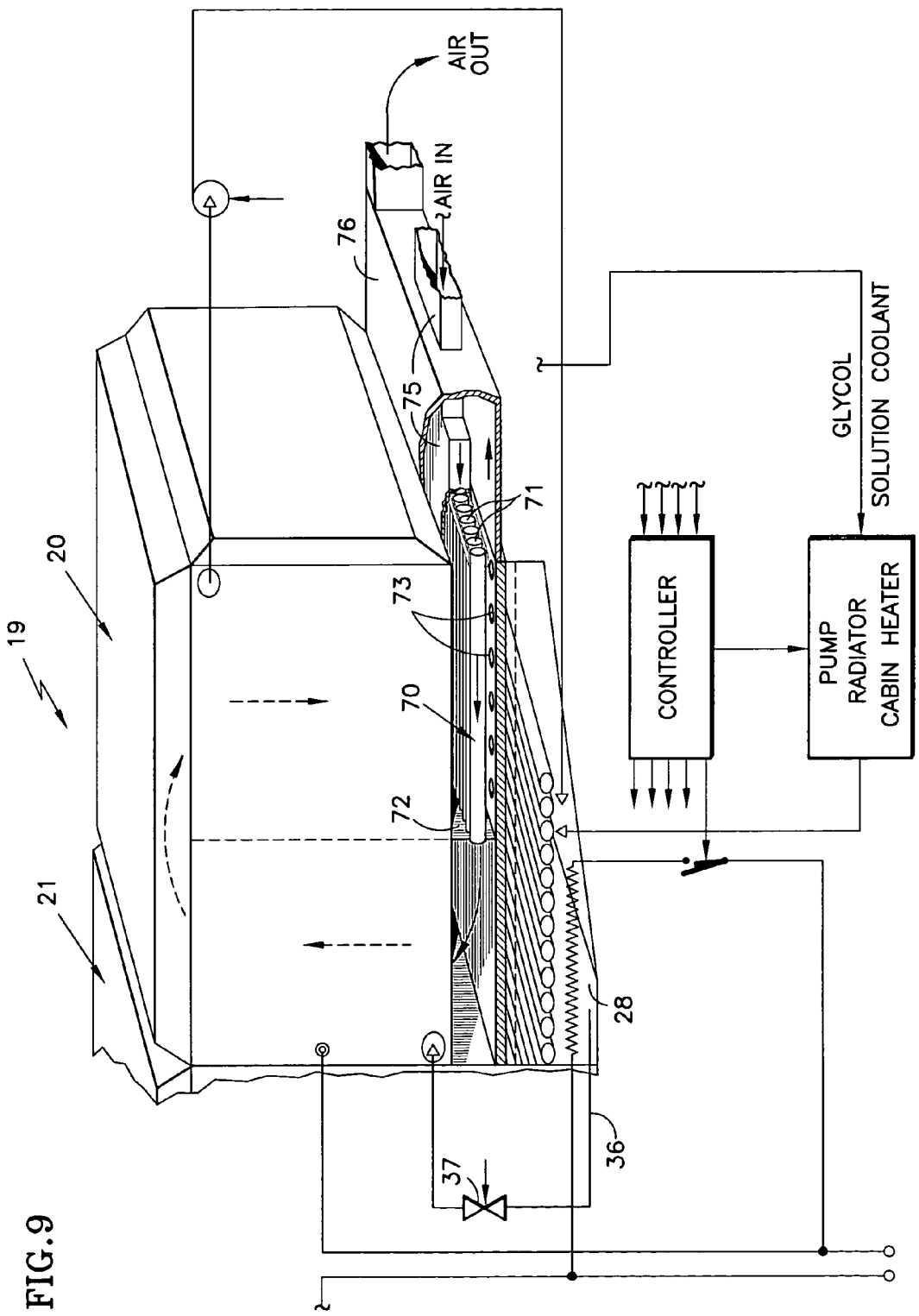
FIG. 9 is a partially sectioned, partially broken away, schematic perspective of a two-section PEM fuel cell stack incorporating a condensing heat exchanger in which cool incoming air is used to condense moisture in the oxidant flow field exhaust.
Figure 10:
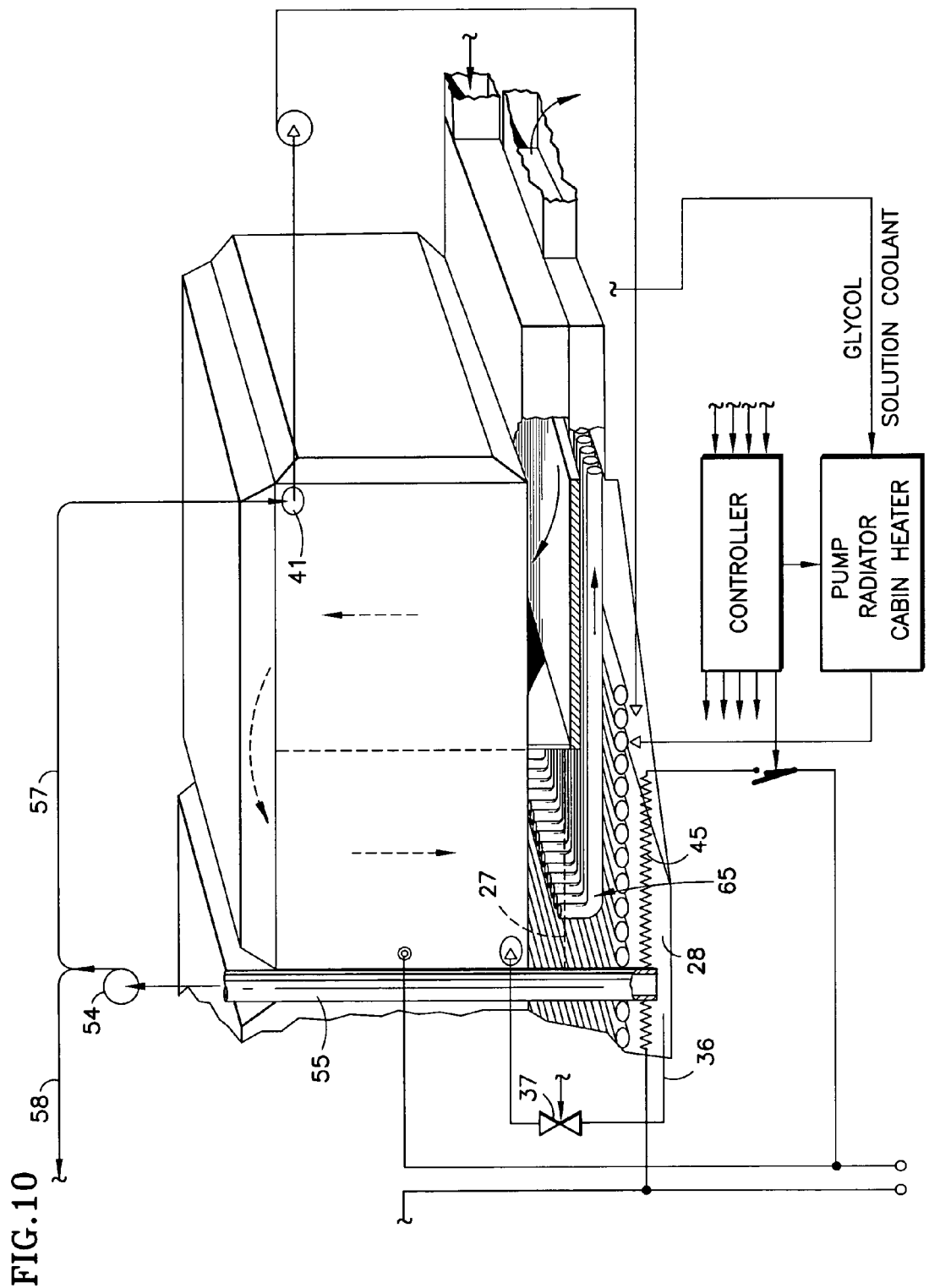
FIG. 10 is a partially sectioned, partially broken away, schematic perspective of a two-section PEM fuel cell stack incorporating features of FIGS. 1, 3 and 5.

According to the invention, a condensing heat exchanger may be used to harness the waste fuel cell heat during a frozen startup for the purpose of melting ice in the coolant water accumulator in a manner shown in FIG. 9. Therein, a condensing heat exchanger 70 comprises a plurality of tubes 71 suspended within a chamber 72 which is in fluid communication with an air inlet duct 75 that is disposed within an air outlet duct 76. The chamber 72 has passageways 73 that permit condensed moisture to flow downwardly into the cooling water accumulator 28. The incoming air, in a freezing environment, will be very cold, thereby causing condensation on the external surfaces of the tubes 71 of warm moisture within the oxidant (air) flow field exhaust entering the chamber 72. Because of the large temperature differential between the incoming air, which may be on the order of −20° C.–10° C. (4° F.–50° F.), and the warm air exiting the cathode flow fields, which quickly raises from about freezing to close to 80° C. (175° F.), there will be significant condensation, thus providing significant water at temperatures ranging from 20° C. to 60° C. (about 68° F.–140° F.), which will melt significant amounts of water within the first ten minutes or so of fuel cell operation following a frozen startup.

The various aspects of the present invention may be used singly, or together with other aspects of the present invention. FIG. illustrates that the heater 45 of FIG. 1 may be used in combination with the conduit 55, auxiliary pump 54, conduits 57 and 58 and with the heat exchanger 65. The heater will melt a small amount of water, and that water will be pumped to the upper coolant manifold 41, so the water is forced by pump pressure out through the water transport plates and into the oxidant flow fields, the water thereafter dripping into the space above the level 27 of coolant in the accumulator 28; at the same time, the warm moist outflow from the oxidant flow fields passing through the heat exchanger 65 will warm the ice (or near freezing water) adjacent thereto, both as a consequence of sensible heat and latent heat of condensation. The heater 45 may be small (such as 1 kW–2 kW) for melting only a little water to start the flow through the auxiliary pump 54, or it may be larger (such as 2.5 kW–5 kW) to provide significant melting of coolant.

Figure 11:
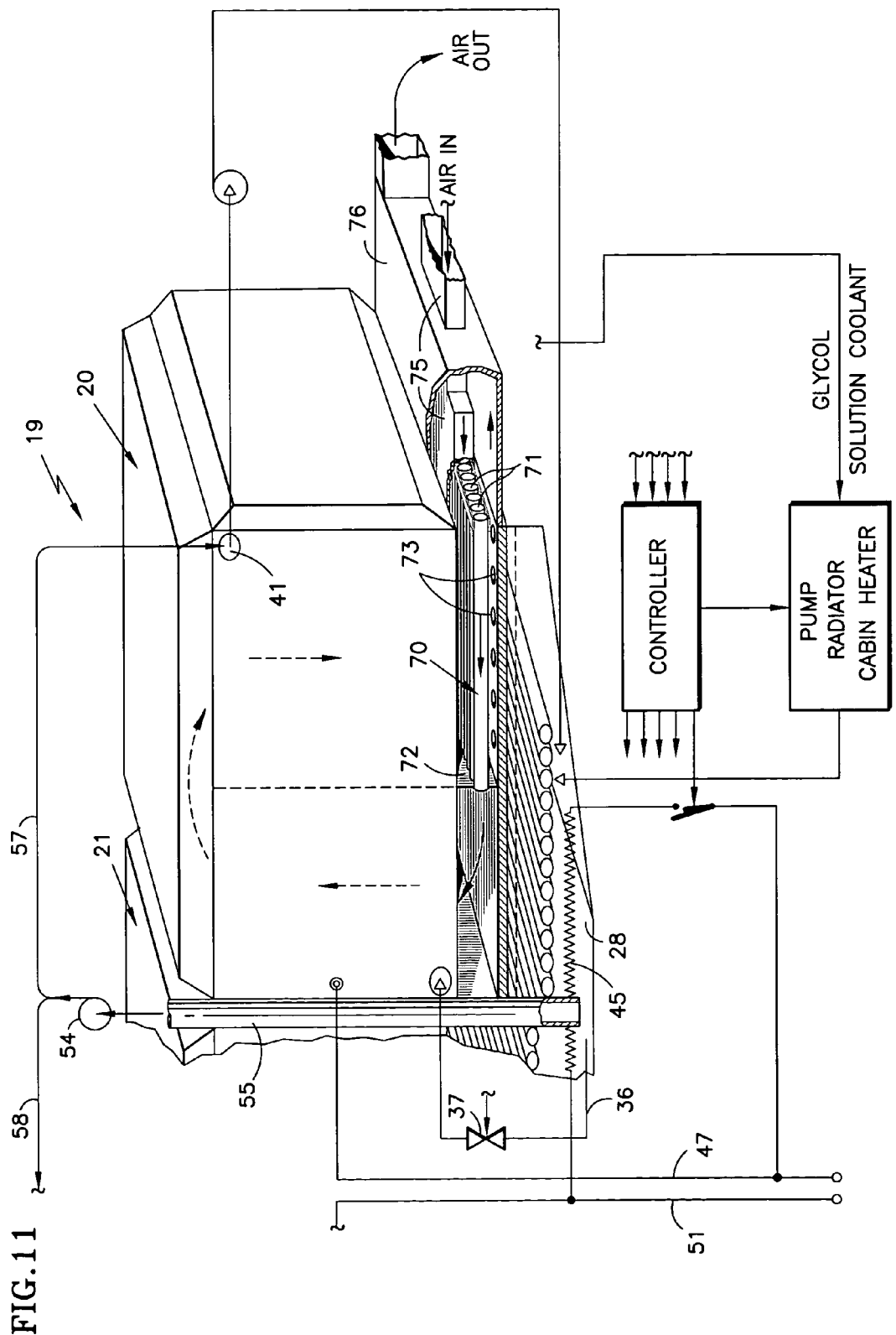
FIG. 11 is a partially sectioned, partially broken away, schematic perspective of a two-section PEM fuel cell stack incorporating features of FIGS. 1, 3 and 9.

Similarly, FIG. 11 illustrates that the heater 45, the conduits 55, 57 and 58, and the pump 54, providing melted accumulator water to an upper coolant manifold 41 can be combined with the condensing heat exchanger 70 of FIG. 9. This results in moisture dripping from the oxidant flow fields into the area of the heat exchanger 70, as well moisture being condensed from the warm, moist cathode exhaust by the heat exchanger 70, so that significant water is provided to drip through the passageways 73, thereby to melt additional ice in the accumulator 28.

Figure 12:
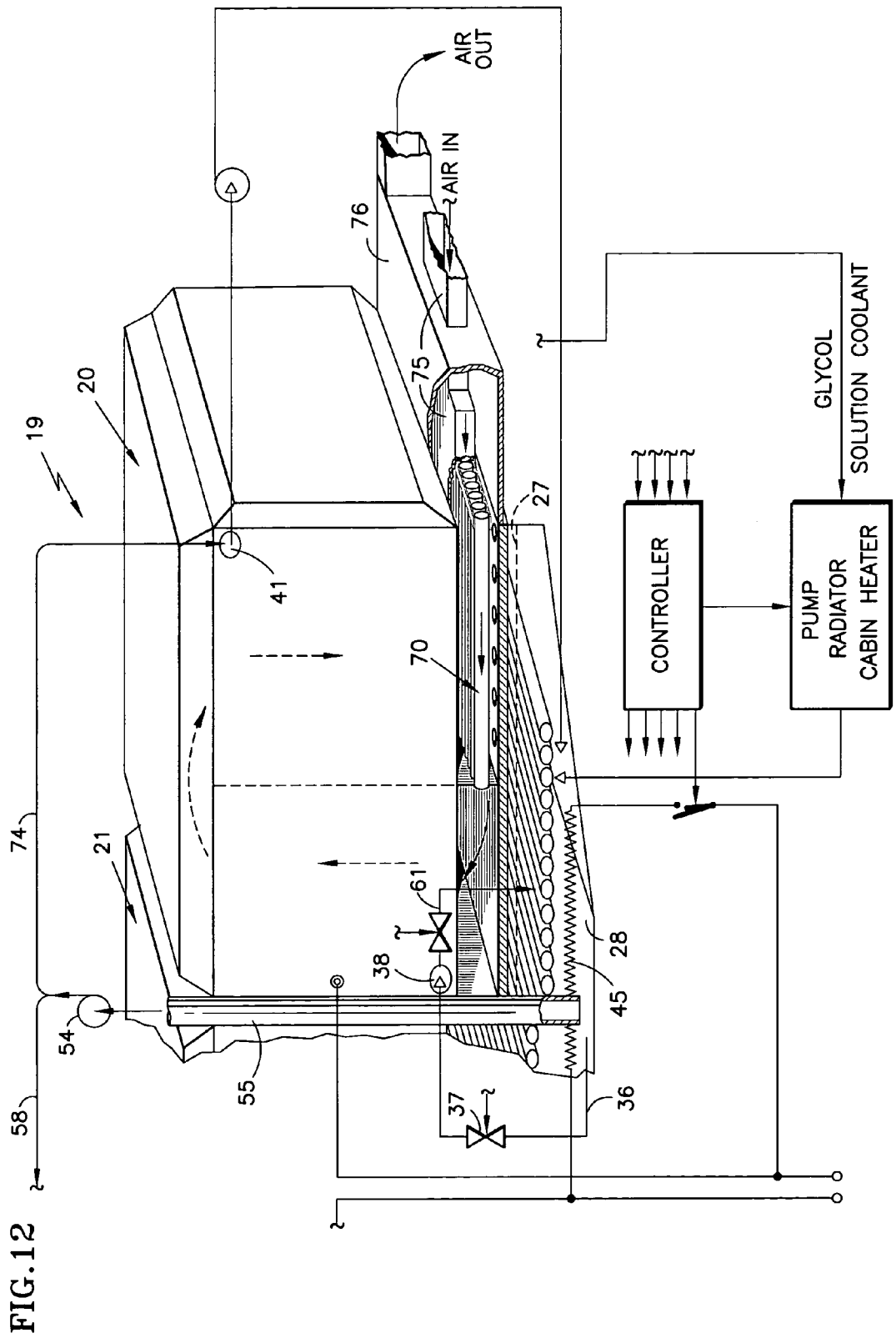
FIG. 12 is a partially sectioned, partially broken away, schematic perspective of a two-section PEM fuel cell stack incorporating features of FIGS. 1, 4 and 9.

FIG. 12 illustrates that the combination of FIG. 11 may have the conduit 61 combined therewith so as to provide warm water flowing through the coolant channels from the lower coolant channel manifold 38 into the accumulator 28, above the level 27 of the coolant therein.

All of the embodiments hereinbefore utilize only energy derived from the stack to melt coolant water and to warm the melted water. However, the invention comprises utilizing energy of the stack to warm the coolant in the accumulator; the invention may be used in a hybrid fashion, in which an initial small amount of water is melted with energy not provided by the stack, after which the stack warms the melted water as described hereinbefore. Thus, transferring energy derived directly from the stack to melt ice in the accumulator can be done with or without the assistance of external energy.

Figure 13:
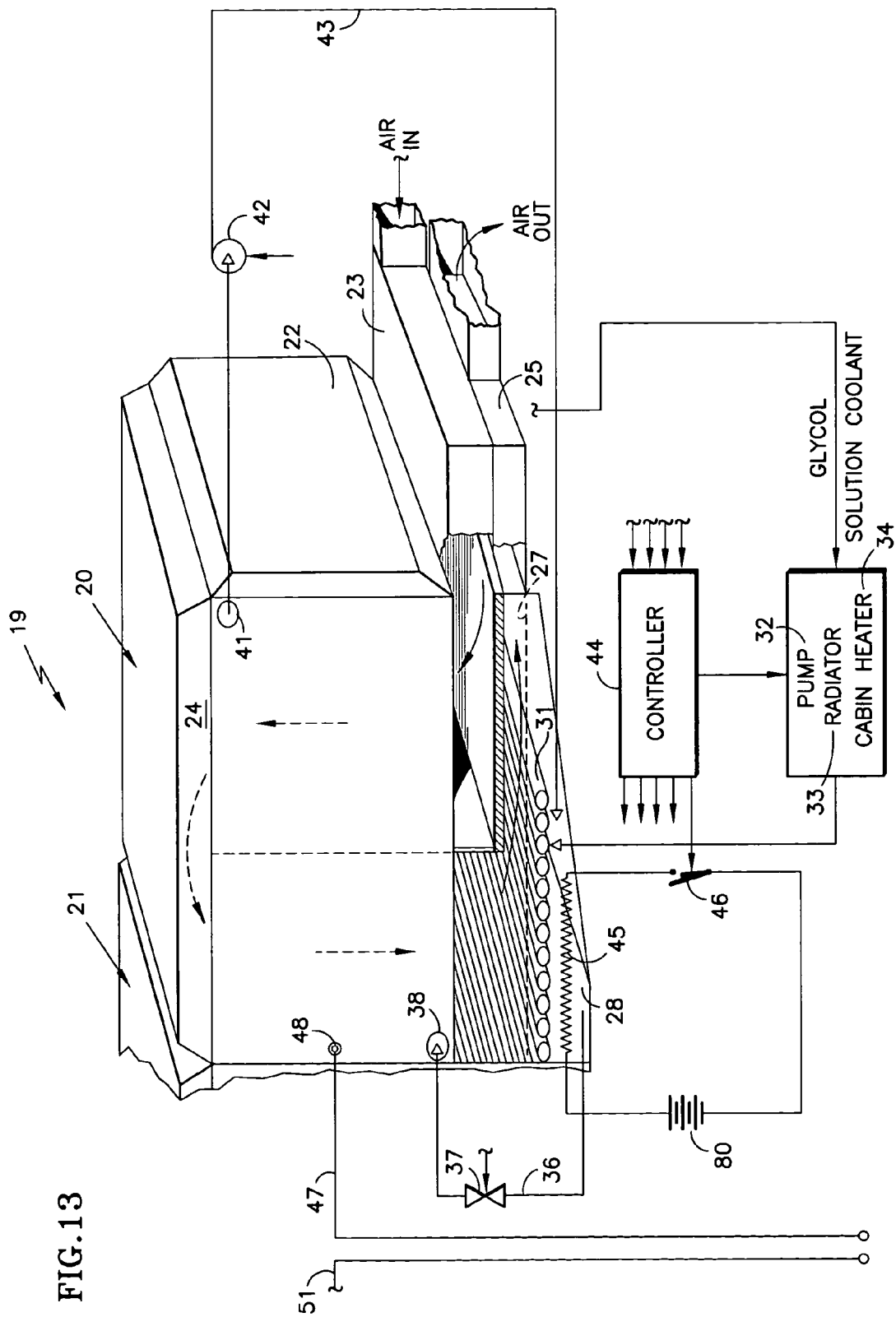
FIG. 13 is a partially sectioned, partially broken away, schematic perspective of a two-section PEM fuel cell stack in which water of the accumulator is initially melted in response to a heater powered by a battery.

One example of a hybrid system is illustrated in FIG. 13. Therein, the heater 45 is not powered by electric power generated by the stack, but rather is powered by a battery 80. Of course, circuitry may be provided to charge the battery 80 with electric power generated by the stack after the stack has assumed normal operation.

Figure 14:
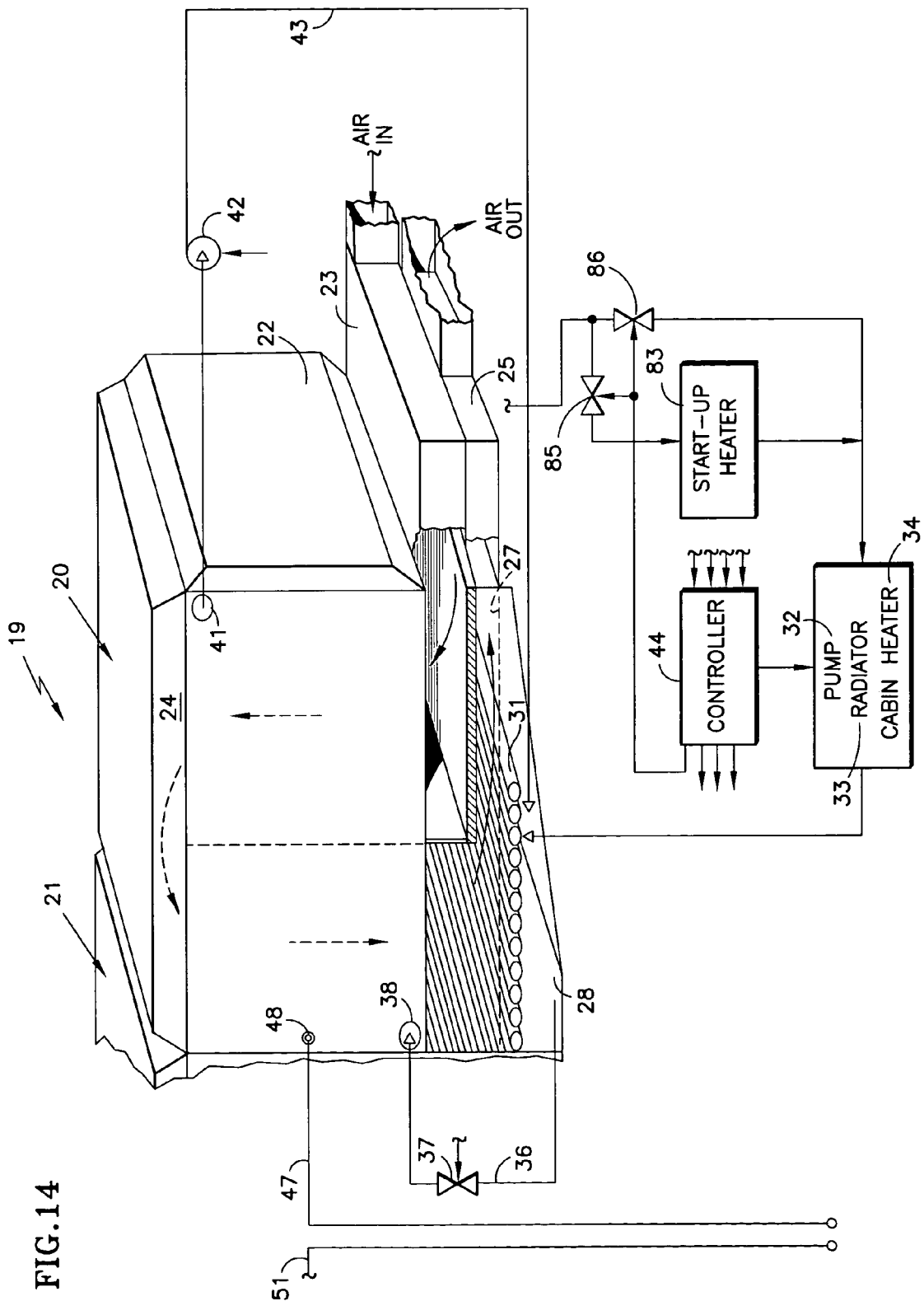
FIG. 14 is a partially sectioned, partially broken away, schematic perspective of a two-section PEM fuel cell stack in which Water of the accumulator is initially melted by heated glycol solution.

Another example is illustrated in FIG. 14. Therein, there is no electric heater and the initial melting of water is accomplished by a start-up heater 83 that can be brought online by the controller 44 opening a valve 85 and closing a valve 86. The startup heater may employ flame or catalytic combustion of fuel, such as fuel cell fuel, including hydrogen and reformate, depending on what is available.

From the heater 83, a heated water/antifreeze solution, such as an aqueous glycol solution, is caused by the pump 32 to pass through the tubes 31 (which are normally used for cooling the fuel cell coolant) and back to the valves 85, 86.

Once a small amount of water is melted, it may be pushed up by oxidant reactant gas pressure, from the bottom of the accumulator 28 through the conduit 36 and valve 37 into the coolant inlet manifold 38 and through the coolant channels of the stack, as described with respect to FIG. 1 hereinbefore. Because the coolant channels have been thoroughly drained during the prior shutdown of the fuel cell stack, there is no ice blockage so water can continue to rise, as fast as it is melted, upwardly through the fuel cell coolant channels until it reaches the coolant outlet manifold 41. Then it will flow to the pump 42 which may be turned on by the controller. As described hereinbefore, a selectively operable vent 40 (FIG. 1) may be required near the coolant exit manifold 41 so as to allow air to escape from the system as it is filled with coolant water.

Or, once a small amount of water is melted, it may be drawn up (FIG. 3) from the accumulator 28 through the conduit 55 by the pump 54, and thence passed over the conduit 57 to the upper coolant manifold 41, as described hereinbefore.

Once in the stack, the near freezing water will be warmed significantly. Thus, the process of melting may be started with external energy and finished using waste fuel cell process heat from the stack.

Figure 15:
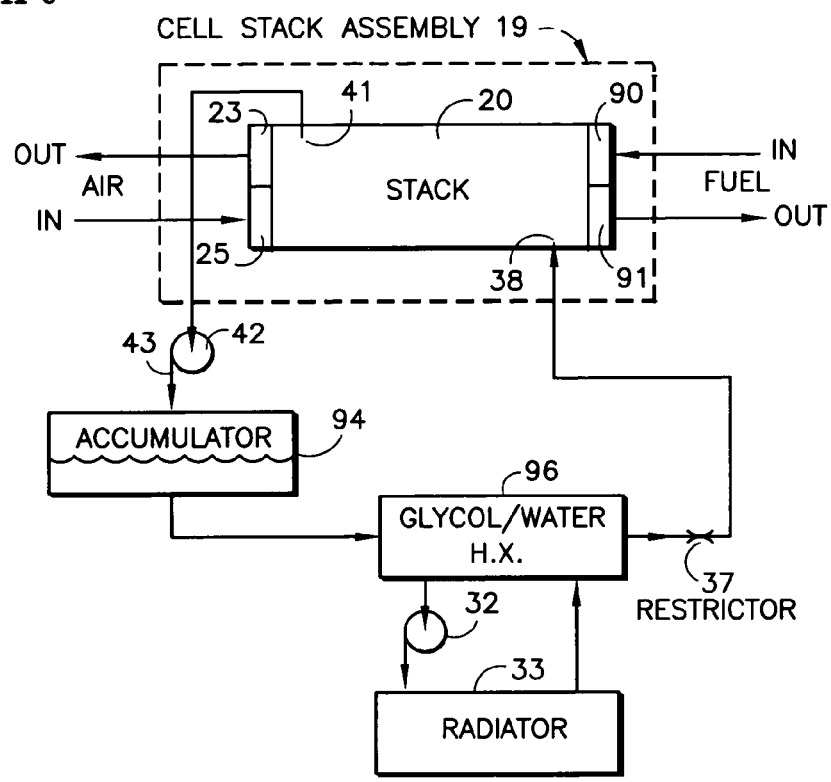
FIG. 15 is a schematic block diagram of a portion of a fuel cell power plant known to the prior art.
Figure 16:
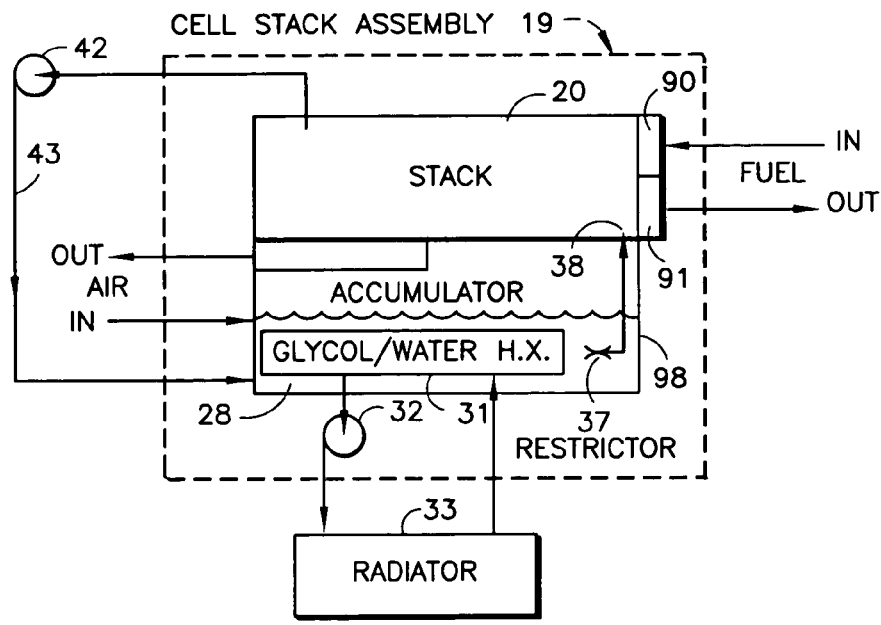
FIG. 16 is a simplified block diagram of a portion of a fuel cell power plant in accordance with the invention.

Another aspect of the invention, which is illustrated in FIGS. 1, 3, 4 and 9–14, is clarified in FIGS. 15 and 16. In FIG. 15, a portion of a prior art fuel cell power plant includes a cell stack assembly 19 which in turn comprises a stack 20 of contiguous fuel cells, fuel inlet and outlet manifolds 90, 91, inlet and outlet manifolds 23, 25 and coolant inlet and outlet manifolds 38, 41. External of the cell stack assembly 19 is a coolant pump 42 and a conduit leading to an accumulator 94, into which water may be displaced before shutting down the fuel cell power plant when in subfreezing conditions. Also external of the cell stack assembly 19 is a glycol-water heat exchanger within which the water coolant from the accumulator 94 has heat removed by heat exchanged with glycol-containing (or other antifreeze-containing) external coolant transferred between the heat exchanger 96 and a radiator 33 (where waste heat is dumped) by means of a pump 32. The coolant water is then returned to the stack through a restrictor 37, which creates the coolant vacuum, that is, causes the coolant pressure to be sub-atmospheric so as to provide the correct pressure differential between the reactant gases and the coolant, as is known.

In accordance with the invention as shown in FIG. 16, a multi-purpose manifold 98 serves as the accumulator 28, and is in fluid communication with either the air inlet or the air outlet. In FIG. 16, the accumulator is in fluid communication with the air inlet. In most of the previous embodiments, the accumulator 28 is in fluid communication with the air outlet. In addition, the glycol/water heat exchanger 31 is made a part of the accumulator. The multi-function manifold is disposed beneath and contiguous with the stack 20 so as to be easily in fluid communication with at least some portions of the stack 20. Not shown in FIG. 16, but illustrated in all of the previous embodiments except that of FIG. 14, the electric heater 45 may also be disposed in the accumulator, within the multi-function manifold 98.

Aspects of the invention illustrated in FIG. 16 may of course be used to advantage with other aspects of the invention described in foregoing embodiments; but may be used to advantage in other embodiments as well.

All of the aforementioned patent applications are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

What is claimed is:

1. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, said method comprising:
    transferring energy derived directly from said fuel cells to the coolant in said accumulator thereby to melt ice in said accumulator, by applying electric power as it is generated by said fuel cell system to a resistance heater disposed in the coolant in said accumulator.

2. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, said method comprising:
    transferring waste heat as it is generated by said fuel cells within said oxidant reactant gas flow fields to the coolant in said accumulator, thereby to melt ice in said accumulator, by
    heating a portion of coolant in said accumulator to provide water; and
    pumping said water, under pressure higher than the pressure in said oxidant reactant gas flow fields, into a coolant manifold connected to said coolant flow channels, which manifold is higher than said accumulator, thereby enabling said water to flow front said coolant flow channels into said oxidant reactant gas flow fields and from said oxidant reactant gas flow fields to said accumulator by force of gravity.

3. A method according to claim 2 of starting a fuel cell system in which said coolant flow channels extend between an upper coolant manifold and a lower coolant manifold which is lower than said upper coolant manifold, and wherein said step of pumping further comprises:
    flowing water into said accumulator from said coolant flow channels through said lower coolant manifold.

4. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, said method comprising:
    transferring waste heat as it is generated by said fuel cells within said oxidant reactant gas flow fields to the coolant in said accumulator, thereby to melt ice in said accumulator, by flowing exhaust of said oxidant reactant gas flow fields through a heat exchanger disposed below coolant level in said accumulator.

5. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, said method comprising:
    transferring energy derived directly from said fuel cells in the form of waste heat as it is generated by said fuel cells within said oxidant reactant gas flow fields to the coolant in said accumulator thereby to melt ice in said accumulator, by flowing inlet oxidant reactant gas from a source through passages in a heat exchanger disposed in a space above and in fluid communication with said accumulator; and
    flowing exhaust of said oxidant reactant gas flow field through said space, the inlet oxidant reactant gas thereby cooling the heat exchanger and condensing water out of the oxidant reactant gas exhaust, said condensed water thence flowing into said accumulator to melt coolant therein.

6. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, in which said coolant flow channels extend between an upper coolant manifold and a lower coolant manifold which is lower than said upper coolant manifold, said method comprising:
    transferring waste heat as it is generated by said fuel cells within said oxidant reactant gas flow fields to the coolant in said accumulator thereby to melt ice in said accumulator, by heating a portion of coolant in said accumulator to provide water;
    pumping said water to said upper coolant manifold; and
    flowing water into said accumulator from said coolant flow channels through said lower coolant manifold.

7. A method according to claim 6 wherein said step of heating comprises:
    applying electric power generated by said fuel cell system to a resistance heater disposed in thermal communication with the coolant in said accumulator.

8. A method according to claim 6 wherein said step of heating comprises:
    applying electric power from a battery to a resistance heater disposed in thermal communication with the coolant in said accumulator.

9. A method according to claim 6 wherein said step of heating comprises:
flowing a heated solution of antifreeze and water through a heat exchanger in thermal communication with said coolant.

10. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, and in which said coolant flow channels extend from a lower inlet manifold to an upper exit manifold, and said oxidant reactant gas flow fields are at a pressure above atmospheric and in fluid communication with said accumulator, said method comprising:
transferring waste heat as it is generated by said fuel cells within said oxidant reactant gas flow fields to the coolant in said accumulator thereby to melt ice in said accumulator, by
heating a portion of coolant in said accumulator to provide a small amount of melt water; and
venting said coolant exit manifold to atmospheric, whereby pressure of said oxidant reactant gas flow fields forces said melt water into said coolant channels so that said melt water is warmed in said stack.

11. A method according to claim 10 further comprising:
reducing the pressure in said oxidant reactant gas flow fields so that said warmed melt water flows back into said accumulator thereby melting additional water in said accumulator.

12. A method according to claim 11 further comprising:
restoring the pressure in said oxidant reactant gas flow fields so more melt water is forced into said coolant flow channels to be warmed; and
reducing the pressure in said oxidant roactant gas flow fields so warmed melt water flows back into accumulator, thereby melting more water in said accumulator.

13. A method according to claim 10 further comprising:
circulating coolant from said coolant exit manifold to said accumulator by means of a pump.

14. A method according to claim 10 wherein said step of heating comprises:
applying electric power generated by said fuel cell system to a resistance heater disposed in thermal communication with the coolant in said accumulator.

15. A method according to claim 10 wherein said step of heating comprises:
applying electric power from a battery to a resistance heater disposed in thermal communication with the coolant in said accumulator.

16. A method according to claim 10 wherein said step of heating comprises:
flowing a heated solution of antifreeze and water through a heat exchanger in thermal communication with said coolant.

17. A method of starting a fuel cell system when at least part of said system is at a temperature below freezing, said fuel cell system having a coolant accumulator and a stack of contiguous PEM fuel cells with (a) coolant flow channels in fluid communication with said accumulator and with (b) fuel and oxidant reactant gas flow fields, said method comprising:
applying electric power, as it is generated by said fuel cells, to an electric heater disposed within coolant in said accumulator;
melting coolant in said accumulator with said heater; and
flowing said melted coolant into said coolant flow channels, thus transferring energy derived directly from said fuel cells to the coolant in said accumulator thereby to melt ice in said accumulator.

18. A method of starting a fuel cell system when at least part of said system is at a temperature below freezing, said fuel cell system having a coolant accumulator and a stack of contiguous PEM fuel cells with (a) coolant flow channels extend between coolant inlet and outlet manifolds in fluid communication with said accumulator and with (b) fuel and oxidant reactant gas flow fields, said method comprising:
transferring waste heat as it is generated by said fuel cells within said oxidant reactant gas flow fields to the coolant in said accumulator thereby to melt ice in said accumulator, by
melting coolant with a heater in said accumulator; and
flowing said melted coolant into said coolant outlet manifold, in reverse through said coolant channels, to said coolant inlet manifold.

19. A method according to claim 17 wherein said step of flowing comprises:
flowing said melted coolant from said coolant inlet manifold normally through said coolant channels to said coolant outlet manifold.

20. A fuel cell system, comprising:
a fuel cell stack having a plurality of contiguous fuel cells, each including an anode, a cathode and a PEM membrane electrode assembly disposed between said anode and said cathode, each cell having reactant gas flow channels and coolant channels;
electric power output connections;
a coolant accumulator in fluid communication with said coolant channels;
an electric heater disposed in said accumulator; and
means for selectively connecting said heater to said electric power output connections within the first few minutes of startup of said fuel cell assembly when at least a portion of said fuel cell assembly is at a temperature below freezing, thereby to melt coolant in said accumulator.

21. A fuel cell system, comprising:
a fuel cell stack having a plurality of contiguous fuel cells, each including an anode having at least one fuel flow field, a cathode having at least one oxidant flow field and a PEM membrane electrode assembly disposed between said anode and said cathode, the oxidant gas flow fields of said cells being separated from said coolant channels by a porous medium;
means, operable at start-up of said fuel cell system, for concurrently applying oxidant gas at a first pressure to said oxidant gas flow fields and fuel gas at a second pressure to said fuel gas flow fields thereby causing said fuel cell system to produce electric power;
a coolant accumulator in fluid communication with said coolant channels, said oxidant flow fields exhausting directly into said accumulator;
a heater, operable at start-up of said fuel cell system, disposed in said accumulator; and
a pump, operable at start-up of said fuel cell system, receiving water adjacent said heater and applying said water to said coolant channels at a pressure higher than said first pressure thereby forcing water through said porous medium to provide a flow of water into said flow fields and from said flow fields into said accumulator.

22. A fuel cell system, comprising:
a fuel cell stack having a plurality of contiguous fuel cells, each including an anode with at least one fuel flow field, a cathode with at least one oxidant flow field and a PEM membrane electrode assembly disposed between said anode and said cathode, each cell having coolant channels;
a coolant accumulator receiving coolant from said coolant channels;
a condensing heat exchanger in direct fluid communication with the coolant in said accumulator for exhausting condensate directly into said accumulator; and
means for flowing oxidant from a source through said oxidant flow fields and to said heat exchanger, thereby transferring waste process heat in (a) oxidant flow exhausting to said heat exchanger directly into (b) said coolant to melt any ice therein.

23. A fuel cell system, comprising:
a fuel cell stack having a plurality of contiguous fuel cells, each inducing an anode with at least one fuel flow field, a cathode with at least one oxidant flow field and a PEM membrane electrode assembly disposed between said anode and said cathode, each cell having coolant channels;
a coolant accumulator receiving coolant from said coolant channels;
a condensing heat exchanger embedded in said accumulator; and
means for flowing oxidant from a source to said oxidant flow fields and for flowing oxidant exhaust from said flow fields through said heat exchanger, thereby transferring waste process heat in (a) oxidant flow exhausting to said heat exchanger into (b) said coolant to melt any ice therein.

24. A fuel cell system, comprising:
a fuel cell stack having a plurality of contiguous fuel cells, each including an anode with at last one fuel flow field, a cathode with at least one oxidant flow field and a PEM membrane electrode assembly disposed between said anode and said cathode, each cell having coolant channels;
a coolant accumulator receiving coolant from said coolant channels;
a condensing heat exchanger in fluid communication with the coolant in said accumulator;
means for flowing oxidant from a source through a first side of said heat exchanger and thence into said oxidant flow fields; and
said oxidant flow fields exhaust to a second side of said heat exchanger, said second side of said heat exchanger being in fluid communication with the coolant in said accumulator, thereby to cause moisture in said oxidant flow field exhaust to condense at said heat exchanger and flow into said accumulator to melt ice therein, thereby transferring waste process heat in (a) oxidant flow exhausting to said heat exchanger into (b) said coolant to melt any ice therein.

25. A fuel cell system, comprising:
a fuel cell stack having a plurality of contiguous fuel cells, each including an anode having at least one fuel flow field, a cathode having at least one oxidant flow field and a PEM membrane electrode assembly disposed between said anode and said cathode, each cell having coolant channels separated from said flow fields by a porous medium;
means for applying oxidant gas at a first pressure to said oxidant gas flow fields;
means for applying fuel gas at a second pressure to said fuel gas flow fields;
a coolant accumulator receiving coolant from said coolant channels, said oxidant flow fields exhausting in direct fluid communication with said accumulator;
electric power output connections;
an electric heater disposed in heat communication with coolant in said accumulator;
means for selectively connecting said heater to said electric power output connections within the first few minutes of startup of said fuel cell assembly when at least a portion of said fuel cell assembly is at a temperature below freezing, thereby to melt coolant in said accumulator;
a pump receiving water adjacent said heater and applying said water to said coolant channels at a pressure sufficiently higher than said first pressure, to force water to flow through said porous medium and to flow into said oxidant gas flow fields;
a condensing heat exchanger in direct fluid communication with the coolant in said accumulator; and
means for flowing oxidant from a source through said oxidant flow fields and to said heat exchanger, thereby transferring waste process heat in (a) oxidant flow exhausting to said heat exchanger into (b) said coolant to melt any ice therein.

26. A method of starting a fuel cell system when at least a portion of it is at a temperature below freezing, said fuel cell system including a fuel cell stack having a plurality of contiguous fuel cells, each including an anode having at least one fuel flow field, a cathode having at least one oxidant flow field and a PEM membrane electrode assembly disposed between said anode and said cathode, each cell having coolant channels separated from said flow fields by a porous medium, electric power output connections, a coolant accumulator receiving coolant from said coolant channels, an electric heater disposed in heat communication with coolant in said accumulator, said oxidant flow fields exhausting in direct fluid communication with said accumulator, said method comprising:
(a) applying oxidant gas at a first pressure to said oxidant gas flow fields;
(b) applying fuel gas at a second pressure to said fuel gas flow fields;
(c) selectively connecting said heater to said electric power output connections within the first few minutes of startup of said fuel cell assembly when at least a portion of said fuel cell assembly is at a temperature below freezing, thereby to melt coolant in said accumulator;
(d) pumping water adjacent said heater with a pump to said coolant channels at a pressure higher than said first pressure, to force water to flow through said porous medium and to flow into said oxidant flow fields; and
flowing oxidant from a source through said oxidant flow fields and to a condensing heat exchanger in direct fluid communication with the coolant in said accumulator, thereby transferring waste process heat in (a) oxidant flow exhausting to said heat exchanger into (b) said coolant to melt ice therein.

27. A fuel cell system having facility to be started when at least part of said system is at a temperature below freezing, comprising:
a coolant accumulator;
a stack of contiguous PEM fuel cells having (a) coolant flow channels in fluid communication with said accumulator and having (b) fuel and oxidant reactant gas flow fields;

a resistance heater disposed in the coolant in said accumulator; and means for applying electric power as it is generated by said fuel cell system to said heater, thus transferring energy derived directly from said fuel cells to the coolant in said accumulator thereby to melt any ice in said accumulator.

28. A fuel cell system having facility to be started when at least part of said system is at a temperature below freezing, comprising
a coolant accumulator;
a stack of contiguous PEM fuel cells having (a) coolant flow channels in fluid communication with said accumulator and having (b) fuel and oxidant reactant gas flow fields; and
means for transferring heat energy derived directly from said fuel cells from within said oxidant flow fields to the coolant in said accumulator thereby to melt any ice in said accumulator, said means comprising:
means for heating a portion of coolant in said accumulator to provide water;
a coolant manifold connected to said coolant flow channels, said manifold being higher than said accumulator; and
means for pumping said water into said coolant manifold under pressure higher than the pressure in said oxidant reactant gas flow fields, thereby enabling said water to flow into said coolant flow channels and from said coolant flow channels into said oxidant reactant gas flow fields and thence into said accumulator by force of gravity and transferring waste heat of said fuel processing to said water which carries said heat to said accumulator.

29. A system according to claim 28 in which:
said coolant flow channels extend between upper and lower coolant manifolds;
and wherein said means for pumping further comprises:
means for flowing water into said accumulator from said coolant flow channels through said lower coolant manifold which is lower than said upper coolant manifold.

30. A fuel cell system having facility to be started when at least part of said system is at a temperature below freezing, comprising:
a coolant accumulator;
a stack of contiguous PEM fuel cells having (a) coolant flow channels in fluid communication with said accumulator and having (b) fuel and oxidant reactant gas flow fields; and
means for transferring heat energy derived directly from said fuel cells from within said oxidant flow fields to the coolant in said accumulator thereby to melt any ice in said accumulator, said means comprising:
a heat exchanger disposed below coolant level in said accumulator; and
means for flowing exhaust of said oxidant reactant gas flow fields through said heat exchanger.

31. A fuel cell system having facility to be started when at least part of said system is at a temperature below freezing, comprising:
a coolant accumulator;
a stack of contiguous PEM fuel cells having (a) coolant flow channels in fluid communication with said accumulator and having (b) fuel and oxidant reactant gas flow fields; and
means for transferring heat energy derived directly from said fuel cells from within said oxidant flow fields to the coolant in said accumulator thereby to melt any ice in said accumulator, said means comprising:
a source of reactant gas;
a heat exchanger disposed in a space above and in fluid communication with said accumulator;
means for flowing inlet oxidant reactant gas from said source through passages within said heat exchanger; and wherein
exhaust of said oxidant reactant gas flow field flows through said space, the inlet oxidant reactant gas thereby cooling the heat exchanger and condensing water out of water vapor in the oxidant reactant gas flow, said condensed water thence flowing into said accumulator to melt coolant therein.

32. A fuel cell system having facility to be started when at least part of said system is at a temperature below freezing, comprising:
a coolant accumulator;
a stack of contiguous PEM fuel cells having (a) fuel and oxidant reactant gas flow fields and having (b) coolant flow channels in fluid communication with said accumulator and said coolant flow channels extend between upper and lower coolant manifolds;
means for transferring heat energy derived directly from said fuel cells from within said oxidant flow fields to the coolant in said accumulator thereby to melt any ice in said accumulator, said means comprising:
means for heating a portion of coolant in said accumulator to provide water;
means for pumping said water to said upper coolant manifold; and
means for flowing water into said accumulator from said coolant flow channels through said lower coolant manifold which is lower than said upper coolant manifold.

33. A system according to claim 32 wherein said means for heating comprises:
a resistance heater in thermal communication with the coolant in said accumulator and powered by electric power generated by said fuel cell stack.

34. A system according to claim 32 wherein said means for heating comprises:
a resistance heater in thermal communication with the coolant in said accumulator and powered by a battery.

35. A system according to claim 32 wherein said means for heating comprises:
a heat exchanger in thermal communication with the coolant in said accumulator and receiving a heated solution of antifreeze and water.

36. A fuel cell system having facility to be started when at least part of said system is at a temperature below freezing, comprising:
a coolant accumulator;
a stack of contiguous PEM fuel cells having (a) coolant flow channels in fluid communication with said accumulator and having (b) fuel and oxidant reactant gas flow fields;
an electric heater disposed within the coolant in said accumulator;
means for applying electric power, as it is generated by said fuel cells, to said electric heater; and
means for pumping into said stack, coolant melted in said accumulator with said heater, thus transferring energy derived directly from said fuel cells to the coolant in said accumulator thereby to melt any ice in said accumulator.

37. A system according to claim 33 wherein said means for pumping comprises:
pumping water in a reverse direction through said coolant channels.

38. A system according to claim 33 wherein said means for pumping comprises:
means for pumping water in a normal direction through said coolant channels.

39. A fuel cell power plant comprising:
a fuel cull stack assembly including a stack of contiguous PEM fuel cells having (a) coolant flow channels extending between coolant inlet and coolant outlet manifolds and having (b) fuel and oxidant reactant gas flow fields extending between fuel inlets and outlets and oxidant inlets and outlets, respectively;
said fuel cell stack assembly including a coolant accumulator disposed immediately beneath and contiguous with said stack, said accumulator being in fluid communication with said coolant outlet manifold and with one of (c) said oxidant inlets and (d) said oxidant outlets.

40. A power plant according to claim 39 further comprising:
a radiator external to said fuel cell stack assembly;
a coolant pump external to said fuel cell stack assembly and in liquid communication with said radiator; and
coolant tubes disposed in said accumulator and in liquid communication with said radiator and coolant pump.

41. A power plant according to claim 39 further comprising:
an electric heater disposed in said accumulator.

42. A power plant according to claim 39 further comprising:
a restrictor disposed in said accumulator at the inlet to said coolant inlet manifold.

43. A fuel cell power plant comprising:
a fuel cell stack assembly including a stack of contiguous fuel cells having (a) coolant flow channels extending between coolant inlet and coolant outlet manifolds and having (b) fuel and oxidant reactant gas flow fields extending between fuel inlets and outlets and oxidant inlets and outlets, respectively;
said fuel cell stack assembly including a coolant accumulator disposed immediately beneath and contiguous with said stack, said accumulator being in fluid communication with said coolant outlet manifold and with one of (c) said oxidant inlets and (d) said oxidant outlets; and
means for transferring energy derived directly from said fuel cells to the coolant in said accumulator thereby to melt any ice in said accumulator, said means for transferring energy selected from one or more of:
(c) an electric heater disposed in thermal communication with said accumulator and means for applying electric power to said electric heater as it is generated by said fuel cells; and
(d) means for transferring to coolant in said accumulator waste heat as it is generated by said fuel cells.

44. A fuel cell power plant comprising:
a fuel cell stack assembly including a stack of contiguous PEM fuel cells having (a) coolant flow channels extending between coolant inlet and coolant outlet manifolds and having (b) fuel and oxidant reactant gas flow fields extending between fuel inlets and outlets and oxidant inlets and outlets, respectively;
said fuel cell stack assembly including a coolant accumulator disposed immediately beneath and contiguous with said stack, said accumulator being in fluid communication with said coolant outlet manifold and with one of (c) said oxidant inlets and (d) said oxidant outlets;
an electric heater disposed in said accumulator; and
means for selectively connecting said heater to said electric power output connections within the first few minutes of startup of said fuel cell assembly when at least a portion of said fuel cell assembly is at a temperature below freezing, thereby to melt coolant in said accumulator.

45. A fuel cell power plant comprising:
a fuel cell stack assembly including a stack of contiguous fuel cells having (a) coolant flow channels extending between coolant inlet and coolant outlet manifolds and having (b) fuel and oxidant reactant gas flow fields extending between fuel inlets and outlets and oxidant inlets and outlets, respectively;
said fuel cell stack assembly including a coolant accumulator disposed immediately beneath and contiguous with said stack, said accumulator being in fluid communication with said coolant outlet manifold and with said oxidant outlets;
the oxidant gas flow fields of said cells being separated from said coolant channels by a porous medium;
means for applying oxidant gas at a first pressure to said fuel gas flow fields;
means for applying fuel gas at a second pressure to said oxidant gas flow fields;
a heater disposed in said accumulator; and
a pump receiving water adjacent said heater and applying said water to said coolant channels at a pressure higher than said first pressure, thereby forcing water through said porous medium into said flow fields.

46. A fuel cell power plant comprising:
a fuel cell stack assembly including a stack of contiguous fuel cells having (a) coolant flow channels extending between coolant inlet and coolant outlet manifolds and having (b) fuel and oxidant reactant gas flow fields extending between fuel inlets and outlets and oxidant inlets and outlets, respectively;
said fuel cell stack assembly including a coolant accumulator disposed immediately beneath and contiguous with said stack, said accumulator being in fluid communication with said coolant outlet manifold and with one of (c) said oxidant inlets and (d) said oxidant outlets;
a condensing heat exchanger in fluid communication with the coolant in said accumulator; and
means for flowing oxidant from a source through said oxidant flow fields and to said heat exchanger, thereby transferring waste process heat in (a) oxidant flow exhausting to said heat exchanger into (b) said coolant to melt any ice therein.

47. A fuel cell power plant comprising:
a fuel cell stack assembly including a stack of contiguous fuel cells having (a) coolant flow channels extending between coolant inlet and coolant outlet manifolds and having (b) fuel and oxidant reactant gas flow fields extending between fuel inlets and outlets and oxidant inlets and outlets, respectively;
said fuel cell stack assembly including a coolant accumulator disposed immediately beneath and contiguous with said stack, said accumulator being in fluid communication with said coolant outlet manifold and with one of (c) said oxidant inlets and (d) said oxidant outlets;
the oxidant gas flow fields of said cells being separated from said coolant channels by a porous medium;
means for applying oxidant gas at a first pressure to said fuel gas flow fields;
means for applying fuel gas at a second pressure to said oxidant gas flow fields;
electric power output connections;
an electric heater disposed in said accumulator;
means far selectively connecting said heater to said electric power output connections within the first few minutes of startup of said fuel cell assembly when at least a portion of said fuel cell assembly is at a temperature below freezing, thereby to melt coolant in said accumulator;

a pump receiving water adjacent said heater and applying said water to said coolant channels at a pressure higher than said first pressure, thereby forcing water through said porous medium into said flow fields;

a condensing heat exchanger in fluid communication with the coolant in said accumulator; and means for flowing oxidant from a source through said oxidant flow fields and to said heat exchanger, thereby transferring waste process heat in (a) oxidant flow exhausting to said heat exchanger into (b) said coolant to melt any ice therein.

48. A fuel cell power plant comprising:

a fuel cell stack assembly including a stack of contiguous fuel cells having (a) coolant flow channels extending between coolant inlet and coolant outlet manifolds and having (b) fuel and oxidant reactant gas flow fields extending between fuel inlets and outlets and oxidant inlets and outlets, respectively;

a multifunction oxidant reactant gas manifold in fluid communication with said oxidant reactant gas flow fields and serving as one of (a) an oxidant inlet manifold or (b) an oxidant outlet manifold, said oxidant manifold being beneath and contiguous with said stack, said oxidant manifold in fluid communication with said coolant outlet manifold and serving as a coolant accumulator.

49. A power plant according to claim 48 further comprising:

a radiator;

a coolant pump in liquid communication with said radiator; and coolant tubes in liquid communication with said radiator and said pump and disposed in said oxidant manifold to serve as a heat exchanger between coolant in said accumulator and external coolant circulated between said radiator and said tubes by said pump.

50. A power plant according to claim 48 further comprising:

an electric heater disposed in said oxidant manifold to heat coolant in said accumulator.

51. A power plant according to claim 48 further comprising:

a flow restrictor disposed in said oxidant manifold at the inlet to said coolant inlet manifold.

* * * * *